United States Patent [19]

Malin et al.

[11] Patent Number: 4,965,743

[45] Date of Patent: Oct. 23, 1990

[54] DISCRETE EVENT SIMULATION TOOL FOR ANALYSIS OF QUALITATIVE MODELS OF CONTINUOUS PROCESSING SYSTEM

[75] Inventors: Jane T. Malin, Houston; Bryan D. Basham, Seabrook; Richard A. Harris, Houston, all of Tex.

[73] Assignee: The United States of America as represented by the Administrator of the National Aeronautics and Space Administration, Washington, D.C.

[21] Appl. No.: 219,295

[22] Filed: Jul. 14, 1988

[51] Int. Cl.$^5$ .............................................. G06F 15/18
[52] U.S. Cl. ..................................... 364/513; 364/578
[58] Field of Search ............... 364/513, 148, 578, 468, 364/478

[56] References Cited

U.S. PATENT DOCUMENTS

| | | | |
|---|---|---|---|
| 4,642,782 | 2/1987 | Kemper et al. | 364/513 |
| 4,649,515 | 3/1987 | Thompson et al. | 364/513 |
| 4,658,370 | 4/1987 | Erman et al. | 364/513 |
| 4,675,829 | 6/1987 | Clemenson | 364/513 |
| 4,796,194 | 1/1989 | Atherton | 364/468 |

OTHER PUBLICATIONS

"Applications of AI in Engineering," Faught, W. S., Computer, 1986, pp. 17-25.
"Deep Knowledge and Simulation in Knowledge--Based Control," Lumley, J., Colloquim on "Real-Time Expert Systems in Process Control", 11/85.
"Expert Systems in On-Line Process Control," Moore, R. L., Kramer, M. A.
"Doing Time: Putting Qualitative Reasoning on Firmer Ground," Williams, B. C., Automated Reasoning, pp. 105-112, 1986.
"Qualitative Reasoning with Deep Level Mechanism Models for Diagnosis of Mechanism Failures," Pan, IEEE, 1984, pp. 295-301.
"Processes in Construction of Failure Management Expert Systems from Device Design Information," Malin et al., IEEE, 1987, pp. 956-967.
"Qualitative Process Theory," Forbus, Artificial Intelligence 24, 1984, pp. 85-168.
"A Qualitative Physics Based on Confluences," De Kleer et al., Artificial Intelligence 24 (1984), pp. 7-83.
"Experience in the Development of an Expert System for Fault Diagnosis in a Commercial Scale Chemical Process," Dhurjati et al., *Intelligent Systems for Process Operations*, pp. 589-619.
"Perturbation Analysis of Automated Manufacturing Systems," R. Suri, Op. Research, IFORS, 1984, pp. 938-948.
"A Specification Language to Assist in Analysis of Discrete Event Simulation Models," Overstreet et al., Com. of the ACM, 2/85, vol. 28, #2, pp. 190-201.
"Qualitative Physics: Past, Present, and Future," K. Forbus, *Exploring Artificial Intelligence*, Morgan Kaufmann, Inc., 1988, pp. 239-2966.

*Primary Examiner*—Allen MacDonald
*Attorney, Agent, or Firm*—Russell E. Schlorff; John R. Manning; Edward K. Fein

[57] ABSTRACT

An artificial intelligence design and qualitative modelling tool is disclosed for creating computer models and simulating therein continuous activities, functions and-/or behavior using developed discrete event techniquers. Conveniently, the tool is organized in four modules: library design module, model construction module, simulation module, and experimentation and analysis. The library design module supports the building of library knowledge including component classes and elements pertinent to a particular domain of continuous activities, functions and behavior being modelled. The continuous behavior is defined discretely with respect to invocation statements, effect statements and time delays. The functionality of the components is defined in terms of variable cluster instances, independent processes and modes, further defined in terms of mode transition processes and mode dependent processes. Model construction utilizes the hierarchy of libraries and connects them with appropriate relations. The simulation executes a specialized initialization routine and executes events in a manner that includes selective inherency of characteristics through the library hierarchy and runs the events through a time and event schema until the event queue in the simulator is emptied. The experimentation and analysis module supports analysis through the generation of appropriate log files and graphics developments and includes the ability of log file comparisons.

25 Claims, 11 Drawing Sheets

```
PUMP.NOMINAL Display/Edit Menu
```
PUMP.NOMINAL
  Description:
    Replace this text with description of mode.
  Faulty?:
    NO
  Mode.Dependent.Processes:
    FLUID.PHASE.PASS-PROCESS
    PRESSURE.C-PROCESS
      Invocations:
        <None>
      Effects:
        PRESSURE.C.D-EFFECT
        PRESSURE.C.U-EFFECT
      Delays:
        MS MS
    CONTAMINATION.PASS-PROCESS
    FLOW.FULL-PROCESS
    DELTA.T-PROCESS
    CLEAR.AHEAD.T-PROCESS
  Mode.Transition.Processes:
    PUMP.NOMINAL.TO.PUMP.SHUTDOWN
    PUMP.NOMINAL.TO.PUMP.CAVITATE
      Invocations:
        IF.INPUT.NOT.SUB.COOLED
          Statement:
            (NOT (D-IN1.FLUID-PHASE
              EQUAL SUB.LIQ))
          Result.Class:
            BOOLEAN-VALUES
      Effects:
        SET.DAMAGE.TREND.UP-EFFECT
          Statement:
            (PUMP1.DAMAGE-TREND ← UP)
        PUMP.CAVITATE.EFFECT
          Statement:
            (CURRENT.MODE ←
              PUMP.CAVITATE)
      Delays:
        <None>

Fig. 8

```
PUMP.CAVITATE Display/Edit Menu
```
PUMP.CAVITATE
  Description:
    Replace this text with description of mode.
  Faulty?:
    NO
  Mode.Dependent.Processes:
    FLUID.PHASE.PASS-PROCESS
    CONTAMINATION.PASS-PROCESS
    PUMP.BEING.DAMAGED-PROCESS
      Invocations:
        IF.DAMAGE.TREND.UP
      Effects:
        TRY.DAMAGING-PROCESS
          Statement:
            (TRY DAMAGING-EFFECT)
      Delays:
        HRS
    DELTA.F-PROCESS
    CLEAR.AHEAD.T-PROCESS
    FLOW.FULL-PROCESS
    PRESSURE.LOW-PROCESS
  Mode.Transition.Processes:
    PUMP.CAVITATE.TO.PUMP.SHUTDOWN
      Invocations:
        IF.PUMP.DAMAGED
          Statement:
            (PUMP1.DAMAGED?
              EQUAL T)
          Result.Class:
            BOOLEAN-VALUES
      Effects:
        DAMAGE.TREND.INACTIVE-EFFECT
          Statement:
            (PUMP1.DAMAGE-TREND
              ← INACTIVE)
        PUMP.SHUTDOWN.EFFECT
          Statement:
            (CURRENT.MODE
              ← PUMP.SHUTDOWN)
      Delays:
        <None>
    PUMP.CAVITATE.TO.PUMP.NOMINAL

Fig. 9

```
PUMP.SHUTDOWN Display/Edit Menu
```
PUMP.SHUTDOWN
  Description:
    Replace this text with description of mode.
  Faulty?:
    NO
  Mode.Dependent.Processes:
    FLOW.NONE-PROCESS
      Invocations:
        <None>
      Effects:
        FLOW.NONE-EFFECT
          Statement:
            (D-OUT1.FLOW ← NONE)
      Delays:
        MS
    CLEAR.AHEAD.F-PROCESS
    DELTA.F-PROCESS
    PRESSURE.NC-PROCESS
  Mode.Transition.Processes:
    PUMP.SHUTDOWN.TO.PUMP.NOMINAL

Fig. 10

DISCRETE EVENT SIMULATION TOOL FOR ANALYSIS OF QUALITATIVE MODELS OF CONTINUOUS PROCESSING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention is a modeling and simulation tool for analyzing both the normal and faulty qualitative behavior of systems and as such relates to the field of discrete event modeling and simulation and to the field of artificial intelligence and qualitative reasoning.

2. Description of the Prior Art

Designing, testing, and operating engineered devices and systems requires analysis of the effects of failures and procedures as they propagate through configurations of components. Such analyses are done in development of failure management expert system software, in the design of system sensors to support failure management, and in failure modes and effects analysis in the areas of safety and reliability engineering. An earlier study has shown the ways in which engineers perform such predictive analyses by using simplified conceptual models and mentally simulating the effects of failures and control actions as they propagate through the system structure. See Malin, J. T., and N. Lance, "Processes in Construction of Failure Management Expert Systems from Device Design Information", IEEE Trans. on Systems, Man, and Cybernetics, 1987, Vol. SMC-17.

To predict and analyze the effects of failures and control actions in components of a system, designers and operators commonly use simplified conceptual models of the behavior of system components and the structure of the system to form mental models which simulate the propagation of effects through the system structure. The components of such systems may exhibit continuous behavior, yet the mental models used by the analyst are frequently not continuous or quantitative, but rather discrete and qualitative. System components are conceived of as having various normal and faulty modes, with different behaviors for each mode. Change in a component mode or input variable can result in qualitative changes in the component or flows through it, which can cause further mode changes or can propagate qualitative changes in variables through the system, affecting the modes and behavior of other components. The analyst traces this change in behavior and notes resulting system changes of interest. Changes of interest can include changes in sensed values at points in the system designed to detect failure, or further failures and degradations caused by an initial failure or failure combination.

If computer models that are analogous to these mental models could be constructed and analyzed, this process of analysis could be performed more consistently and rapidly. More complex and extensive analyses beyond the capacity limitations of mental modeling could be performed.

The invention is a generic modeling tool that provides a software version of human qualitative analyses of device and system behavior. The objective in producing the invention is to provide modeling and simulation methods that correspond to the common sense methods of human experts. This goal has led to extensions of the capabilities of both qualitative modeling and discrete event simulation. These efforts include qualitative fault modeling, adaptation of discrete event structures to accommodate models of process systems, and combining qualitative modeling and discrete event simulation.

The tool is oriented toward supporting analysis of a range of engineered space systems, such as a two-phase thermal bus system or an electrochemical air purification system, but is not limited to such systems. These types of systems exhibit diagnostic problems associated with sparse sensor data and inaccessibility, and modeling problems associated with complex processing components and complex processed substances.

QUALITATIVE MODELING BACKGROUND

There is a large body of research in artificial intelligence containing results of investigations of this type of common sense reasoning. This area of research is called qualitative representation and reasoning. The dynamic behavior of continuous physical systems is described in terms of a set of qualitative state variables and qualitative equations or constraints that describe their interactions or dependencies. When a continuous state variable is divided into a set of regions of interest (often positive, zero, and negative), it is a qualitative state variable. Thus, the qualitative value of a continuous quantity is determined by the region it is in.

Two general types of qualitative reasoning approaches have been developed, namely, device-centered and process-centered approaches. Device-centered models use a set of local models of the behavior of each type of component in a system ("device"), and connections through which information is communicated between the components. For example, a device such as a buzzer might be composed of a clapper, a coil, and a battery, and the wires and fields that connect them, so that outputs from a component can become inputs of other components. The local component models may have a number of distinct behavior regions, and may not only specify the behavior of the component in each region, but also the conditions that cause a transition from the current behavior region to another. The device model is a network of components and connections representing the structure of the system. Reasoning is accomplished by propagating information through the local connections. See, for example, J. De Kleer and J. S. Brown, "A Qualitative Physics Based on Confluences", Artificial Intelligence, December 1984, Vol. 24.

Process-centered models use a set of models of physical processes (e.g., flow, chemical synthesis boiling), which need not be local, but may include a system of related components in which the process is occurring. Situations can be described as networks of components and attribute relationships. Reasoning is accomplished by scanning the structure for conditions that are required for any process to occur. Processes make changes in the situation, which cause further processes to become active or inactive. See, for example, K. D. Forbus, "Qualitative Process Theory", Artificial Intelligence, December 1984, Vol. 24.

Much of the qualitative reasoning work has focussed on developing representations and reasoning methods to generate the set of all possible histories or sequences of patterns of state variables in a system. Another line of work has focussed on using qualitative representations of normal system behavior to generate explanations for an observed abnormal system behavior. Another line of work has focussed on generating an explanation of the function of a system based on a qualitative description of the behavior of its components and its structure.

The common method for generating explanations and determining the historical, qualitative values of state variables in a system is constraint propagation. The constraints define dependencies among variables in the models, and known values are used to assign additional values using the network of constraints. This approach has the advantage of starting the solution process anywhere in the network, using whatever values are available. The network of constraints is used as assigned values are tested to determine if they satisfy constraints. The tests are conducted by working through the network. The system may ultimately fail to assign all the desired values. The network is also used to identify inconsistencies between constraints and values. This capability serves as the basis for failure diagnosis.

The approach is significantly different from the approach used in discrete event simulation, where the simulation moves forward deterministically in time, performing the computation associated with component behavior when it is scheduled to occur. To combine a qualitative representation and a discrete event simulation, a qualitative representation suitable for discrete event simulation is needed. Such a representation should have an explicit representation of time. In addition, such a representation should permit the local behavior of any component to be determined unambiguously at each step in the simulation.

Qualitative reasoning approaches typically lack explicit representations of time, duration, and delays, which are often used by a mental modeler, especially to analyze interacting dynamic processes. B. C. Williams, "Qualitative Analysis of MOS Circuits", Artificial Intelligence, December 1984, Vol. 24, discusses some of the limitations of these approaches, and presents a general approach to representing time qualitatively and reasoning about qualitative episodes for use in temporal constraint propagation, but not in discrete event simulation.

Most researchers in qualitative reasoning have not been concerned with representing the analyst's model of a system as composed of components that have a set of modes of normal and faulty behavior, and a set of events that cause transitions among those modes.

Pan, J. Y., "Qualitative reasoning with deep-level mechanism models for diagnoses of mechanism failures", Proc. First Conference Art. Int. Applications, Denver, Colo., Dec. 1984, proposed qualitatively modeling behavior of faulty and normal modes and using qualitative reasoning (constraint propagation) to predict types of behavior events from the qualitative model, including instantaneous events, trends, trend-breakpoints, stabilization and mode-transitions. Modeling includes a time-scale concept to specify delay of a mode-transition and duration of trend-type events.

The work leading up to the invention was based on the idea that the types of events resulting from qualitative reasoning like those proposed by Pan could be themselves represented as part of the qualitative model, and with an explicit specification of qualitative regions of time delays, could be used in discrete event simulation. Furthermore, they could be directly specified by the analyst, rather than produced by a qualitative reasoning system. This approach of direct specification eliminates some of the problem of ambiguity inherent in qualitative reasoning. The statistical facilities commonly resident in discrete event systems could also be used explicitly to represent and explore ambiguities of interest to the analyst.

DISCRETE EVENT SIMULATION BACKGROUND

Discrete event modeling and simulation is characterized by state changes in a system's entities, "events", that occur discretely rather than continuously (as they would in differential equation models), and by provision for occurrence of these events at nonuniform intervals of time. In the commonest form of discrete event simulation, events are scheduled to occur at some interval from the present time. Throughout the simulation, new events are scheduled and added to an event list that contains records of events and the time they are scheduled to occur. Time advances in nonuniform intervals to the time of the next event (the one on the list with the earliest scheduled time), which is selected for execution and removed from the event list. For systematic discussions of discrete event simulation, see George S. Fishman, *Concepts and Methods in Discrete Event Digital Simulation,* John Wiley & Sons, 1973.

Discrete event simulation has been used almost exclusively to solve queueing-oriented service scheduling problems, in which there are concerns about distribution and selection of workload, resources, and tasks in a system of "server" entities providing services to a set of customers or "job" entities. The basic modeling objects and simulation control programs of discrete event simulation tools and languages have been tailored to these problems. These tools and languages are widely and productively used in systems engineering, operations research, and management science.

There are three main approaches to modeling for discrete event simulation for queueing-oriented problems. The predominant approach, event scheduling, uses a scheduled event list. As scheduled events (including events of beginning or ending a service activity) come up, they are executed, unconditionally. Another approach, namely, activity scanning, does not use an event list. All activities are conditional, and whenever time is advanced, all are considered for beginning or ending by a method that is analogous to the scanning of processes in process-centered qualitative reasoning. The third approach, namely, process interation, focusses on a sequence of activities and events that describe the total history of the progress of a servicing job, and interaction between processes related to several jobs. To support this approach, both a scheduled event list and a scanned list of conditional events may be used, combining the other two approaches.

The fundamental discrete event approach has potential use for solving not only queueing-oriented scheduling problems, but also other types of problems concerning systems whose behavior can be modeled discretely. Qualitative models have this discrete character. Bernard P. Zeigler, *Multifaceted Modelling and Discrete Event Simulation,* Academic Press, 1984, has formalized the general fundamentals of discrete event simulation in the discrete event system specification (DEVS) formalism for specifying a range of models expressible within discrete event simulation languages, including the three main modeling approaches used for queueing-oriented problems. This formalism includes the concept of components of a system, coupled together so that they interact with the output of one used as input to another. This formalism demonstrates the possibility of modular definition of hierarchical structures of components in discrete event simulation system. There is a distinction between active and passive components, and the concept of phases of component behavior. Within these phases, state transition and output functions determine how inputs are processed, how phases change, and how outputs are produced. Type of links can be defined, and the variables permitted on those links can be constrained. It is in the context of this general definition of discrete event simulation that the invention formulates a new modeling approach defined to support solving of problems that require an understanding of the effects of failures and control actions as they propagate through component configurations.

COMBINING QUALITATIVE MODELING AND DISCRETE EVENT SIMULATION

Discrete event simulation systems are reasonable candidates for analyzing qualitative models of dynamic processing systems. They permit the analyst to observe a sequence of significant events, with "time" jumping discontinuously from event to event. Current queueing-oriented approaches are not designed to handle qualitative models of continuous systems, however. They are designed to model systems that exhibit discrete behavior in the real world, not ones that are really continuous. A new discrete event simulation approach is needed, tailored to handle types of discretized continuous phenomena such as qualitative trends, which might be interrupted during the delay between their beginning and their scheduled end.

To develop this new discrete event simulation approach, a number of new concepts and methods were developed. These new concepts and methods include a new definition of a component model, a new definition of the types of links connecting components ("relations" and "variable clusters"), new state transition structures ("processes"), new methods for representing qualitative and quantitative functions ("process language"), and new methods for hierarchically specifying models of component connections in libraries. A novel simulation control approach, and new methods for experimenting with models and analyzing model behavior resulting from a simulation have also been developed.

OBJECT-ORIENTED AND GRAPHICAL SPECIFYING OF MODELS

These concepts and methods were developed to permit use of simulation facilities that are provided in discrete event simulation tools such as SimKit TM. The methods were developed for object-oriented programming environments, such as is provided by the KEE TM software for building expert systems, and which make effective use of the classification capabilities of such environments. Currently, the tool uses the SimKit TM capabilities to support the development of graphical libraries of component models, and permits engineers to build device models graphically. A model is built by using component objects from a library, and connecting them with relations that define data flow between components in terms of variable clusters associated with types of process flows.

COMPONENT MODELS AND PROCESSES AND PROCESS LANGUAGE

The core of a component model is its mode-transition diagram, which specifies modes of operation (both normal and faulty) and the transitions among them. Mode-specific behavior and mode transitions are specified as processes. The processes can be specified with a range of qualitative and quantitative syntaxes, using data-structure types and operators in the language portion of each modeling library. Processes consist of three parts: invocations (preconditions for effects execution), effects (executed if all invocations are satisfied), and delays corresponding to each effect (effect completions scheduled at increments to the current time). The concept of operating modes and mode-transition processes provides a capability for representing process-oriented qualitative model information within the fundamentally device-oriented discrete event system.

Computation and specification requirements are reduced by focusing the level of component description on modes of operation, and specifying qualitative ranges of component variables relative to mode transition boundaries. Discrete events are defined at the level of changes in operating modes, and simulation processing need occur only when modes change or variables cross qualitative boundaries. Rather than constraint propagation, discrete event processes determine the consequences of component changes.

Continuous behavior is partitioned into trends and breakpoints. The durations of trends can be represented as an approximate order of magnitude, which is translated into an interval on the discrete event clock. When defining a process qualitatively, the modeler controls the ambiguity and combinatorial explosion problems inherent in qualitative modeling by selecting single outcomes for qualitative functions. The modeler can also use qualitative trends and higher order derivatives in defining processes to help reduce ambiguities.

RELATIONS AND VARIABLE CLUSTERS

Relations define the connections between specific variable clusters in one component with specific variable clusters in another component. The concept of variable clusters permits the definition of multiple variables associated with types of flows in a system and accommodates component models with multiple types of input and output "ports". The user can define a hierarchy of relation types, and specify constraints on types of components that can be connected by them. The method of specifying variable cluster types also provides the means of controlling whether a variable change should result in a component update event or a propagation of the change to related components.

CONTROL OF SIMULATION AND SCHEDULING

The discrete event simulation control structure was developed to control the propagation of behavior changes among components. Scheduled events change variable values, make mode transitions, and pass data between components along the relations. The primary event is the update of a component, which can be triggered by a change in an input variable, local variable, or component mode. In such an event, appropriate processes are inspected, and the effects of invoked processes are scheduled with corresponding delays. Updates originating from many components can be scheduled at the same time on the discrete event clock.

EXPERIMENTATION AND ANALYSIS

The objective of any discrete event simulation and modeling tool is to support analysis and experimentation to resolve questions about how various versions of the modeled system will behave. The inventions described here support a broad set of types of experimentation and analysis that would be needed by an engineer investigating the effects of failures and procedures as they propagate through configurations of components.

ADVANTAGES RELATIVE TO GENERAL SIMULATION TECHNIQUES

Object-Oriented—One of the best features of the invention, herein called tool, is that it has been built in an object-oriented environment. Therefore, component classes are built in an subclass hierarchy, with inheritance, and the model components are created as object members of these classes which inherit all of the functionality of its parent class with the ability to change information locally, such as variable values or the component's mode. Relation types are also object classes, so specific relations between model components inherit their information and functionality from their respective classes. The other elements of the tool, i.e., variable clusters, processes, modes, valueclasses, operators, and operations, are created as objects as well.

Separation of Component Classes from Model Component Instances—The tool separates the classes of components in the library from the instances of components which make up a model. This separation enables the model builder to change a component class's behavior and have it inherited down to the component instances so that for each new simulation run, all of the model component instances of the changed class will have the new functionality.

Graphical Representation of the Simulations—Models are constructed in a graphical window allowing the user to draw a schematic of the modeled system. As the simulation runs, the user can watch a graphical representation of the changes occurring within the model, instead of abstract data collection common to most current simulation analysis techniques. These graphical changes are represented by using different bitmaps for the different modes of a component, and by animating the propagation of values for a particular variable along the relation line-images in the schematic of the model.

Functional Groupings by Variable Clusters—Components and relational "flows" are grouped together by Variable Clusters, sometimes referred to as "VC", to form functional collections within a model. This allows the user to view and analyze simulations based on the functional groupings of the model.

Expressive Power and Simulation Efficiency—The tool has considerable expressive power. It allows the creation of a large number of components and a nearly infinite number of possible models. The tool's efficiency resides in its ability to process the component's behavior only when necessary, that is, when a change occurs within the component itself and in the fact that the clock of the simulator is not singly incremental, but leaps forward to the time of the next event on the event list, a feature of discrete event simulation tools.

ADVANTAGES RELATIVE TO PRIOR DISCRETE EVENT SIMULATION

Servers vs. Components—In traditional discrete event simulation, the functional elements of the model are called "servers". These elements simply take in an individual (discrete) item from its input queue, process that item, and then send the processed item downstream. The tool calls the basic functioning element a component. These components are conceptually more complex and flexible than the server. A server is usually modeled as something which transforms, or processes, the items on its input queue. Server-defined models usually only contain few such processes, and if a failure of a server is to be modelled, then it is usually represented as a cessation of all processing involving the server. By contrast, components in the tool may have many behavior modes which may include one or more failure modes. Moreover, occurrence of a failure mode need not halt the processing of the component, but simply alter its behavior. In traditional discrete event simulation, the servers are either passive or active; whereas, in the tool the model components are active all of the time, even when they are in a failure mode.

Sensors as Components—In the tool, sensors represent a possible important type of component. The tool allows the model builder to model the way in which sensor information affects the system and how that information affects the diagnosability of failure modes of the system.

Jobs vs. "Flow of Parameter Information"—In traditional discrete event simulation, the items which move from one server to another are called jobs. Jobs can be any number of things to be processed by the servers. In the tool, this is replaced by the concept of "flow of parameter information" where values for component parameters (variables) are propagated from one component to another along relations. This permits modeling of the effects of continuous flows in the system.

Relations—In discrete event simulation, there has traditionally been only one concept of relation between servers, namely the "downstream" concept in which jobs completed by one server are moved downstream to another, where the job is then placed on the later server's input queue. In the tool there can be many types of relations, multiple relations defined in a library, multiple relations used in one model, and multiple relations between two components. These relations describe a set of variables in the "domain" component that are to be propagated to another set of variables in the "range" component. These relations control the flow of information from component to component, and thus, through the model.

Modeling Systems with Continuous Behavior—Components and the flow of information across relations allows simulation of a model which is radically different from traditional discrete event simulation, which is oriented to studying the processing of items on input queues by servers, such as assembly of cars on a factory floor. The tool allows modelling of systems whose behavior is continuous in nature. Therefore, the inputs are not stacked on a queue, but rather are processed immediately by the component; the component then alters its internal variables and mode appropriately. The results of such behavior may be the propagation of more information to other related components.

Results of the Simulation—In light of the above, the results of the simulation with respect to the tool can be quite different from prior art modelling simulations. Whereas, in traditional discrete event simulation the results may be an analysis of the servers' queue lengths and idle times, the tool's simulation usually results in an understanding of the effects of the failure of some component or the propagation of some parameter value through the model. Therefore, one result of the simulation can be a record of the mode changes of certain components with respect to time.

Components Affecting Others within the Model—The mode of one component can, and probably will, affect the behavior of other components in the model. This interaction does not occur in traditional discrete event simulation. Also, existence of failure modes of a component does not necessarily make the component's behavior inactive, or passive, in the tool.

Types of Scheduling—It is instructive to contrast tool capability and performance with two different discrete event simulation techniques. These are "Event Scheduling" (ES) and "Activity Scanning" (AS). In "Event Scheduling" the scheduler is used to control sequential execution of the events on the event list unconditionally. In "Activity Scanning", the simulation control structure periodically scans all of the possible effects to determine which have met their conditions and then executes those events. The tool uses the scheduler in a manner which combines these two approaches so that both conditional and unconditional events can be scanned and scheduled. It processes two types of events: component update and effect events. To accomplish component update events the tool scans the possible processes of the component based on the mode independent processes and the component's current mode to determine which have met their invocation conditions and then either executes or schedules the effect events of those processes. The tool executes scheduled effect events unconditionally with one exception, the Try-Process effect event. This Try-Process effect event determines if the specified process's conditions are met and, if so, runs, or schedules, the effect events of that process.

Scheduling Techniques for Continuous Behavior—The tool also makes novel use of the scheduler by employing delays for the effect events and the Try-Process effect event type to model systems with continuous behavior.

ADVANTAGES RELATIVE TO QUALITATIVE MODELING

Single Scenario Simulations—In traditional qualitative simulation, models are constructed from constraint equations using a qualitative mathematical calculus. Constraint propagation is used to produce a compiled history of all possible scenarios. The tool allows the user to simulate one scenario at a time by varying the initial parameters, e.g. component variables and initial mode, of the model. The tool also allows the user to alter and fine tune the behavior of entire component classes, easily, and then run the model for each new alteration to see the effects on the system.

Qualitative Languages—The tool allows the user to write the invocation and effect statements using a qualitative mathematical language. The library builder uses this language to define a customized set of qualitative valueclasses (qualitative ranges for system parameters like flow and effort), as well as the operators, and their respective operations. These operations act in the effect statements to calculate qualitative values.

SUMMARY OF THE INVENTION

A specialized qualitative modeling and discrete event simulation tool comprising four modules is described. The tool is used for creating computer models and simulating continuous activities, functions and/or behavior using developed discrete event techniques. The modules consisting of the library design module, the model construction module, the simulation module and the experimentation and analysis module. The tool enables experimentation and analysis of the qualitative models created and is implemented in a general purpose digital computer configured with a system language with a defined structure, syntax and vocabulary enabling the user to create library knowledge bases to be used in constructing models. The computer has related operating components for compatible memory storage and processing, insertion, reviewing, editing and delivery of information.

The library design module supports building library knowledge bases that contain component classes and elements pertinent to the particular domain of continuous activities, functions and behavior being modeled. The continuous behavior is defined discretely with respect to invocation statements, effect statements and time delays. All functionality of the components is defined in terms of variable cluster instances, independent processes and modes which are defined in terms of their mode transition processes and mode dependent processes. Library elements include components, processes, relation types and language elements, which, in turn, includes valueclasses, operators and operations. Library elements are organized in hierarchical subclasses and are useful in defining models of both physical objects and abstract concepts, for example, as condition states associated with a medical diagnosis.

The model construction module supports building models by making component instances of the component classes and connecting them with appropriate relations. The simulation module supports the simulation of the models built by the model construction module without dependence on model configuration. The tool initializes models with predefined components by executing a specialized initialization routine and placing each component in the model in an event list. The model is run by executing events on the event list using a discrete event simulator until the list is empty.

The experimentation and analysis module supports the analysis of the output generated by the simulation module. This support includes compilation of relevant statistics, and diagnostic information describing failure effects. Additional analysis is obtained by comparison of log files to specify the differences in outcomes of specific scenarios.

BRIEF DESCRIPTION OF DRAWINGS

So that the manner in which the above-recited features, advantages and objects of the invention, as well as others which will become apparent, are attained and can be understood in detail, more particularly description of the invention briefly summarized above may be had by reference to the embodiment thereof that is illustrated in the drawings, which drawings form a part of the specification. It is to be noted, however, that the appended drawings illustrate only a preferred embodiment of the invention and are, therefore, not to be considered limiting of its scope for the invention may admit to other equally effective embodiments.

In the Drawings

FIG. 8 is an example of a component mode (in this case it is a pump nominal)

FIG. 9 is an example of a component mode (in this case it is pump cavitate)

FIG. 10 is an example of a component mode (in this case it is pump shutdown)

DETAILED DESCRIPTION OF THE PREFERRED EMBODIMENT

Figure 1:
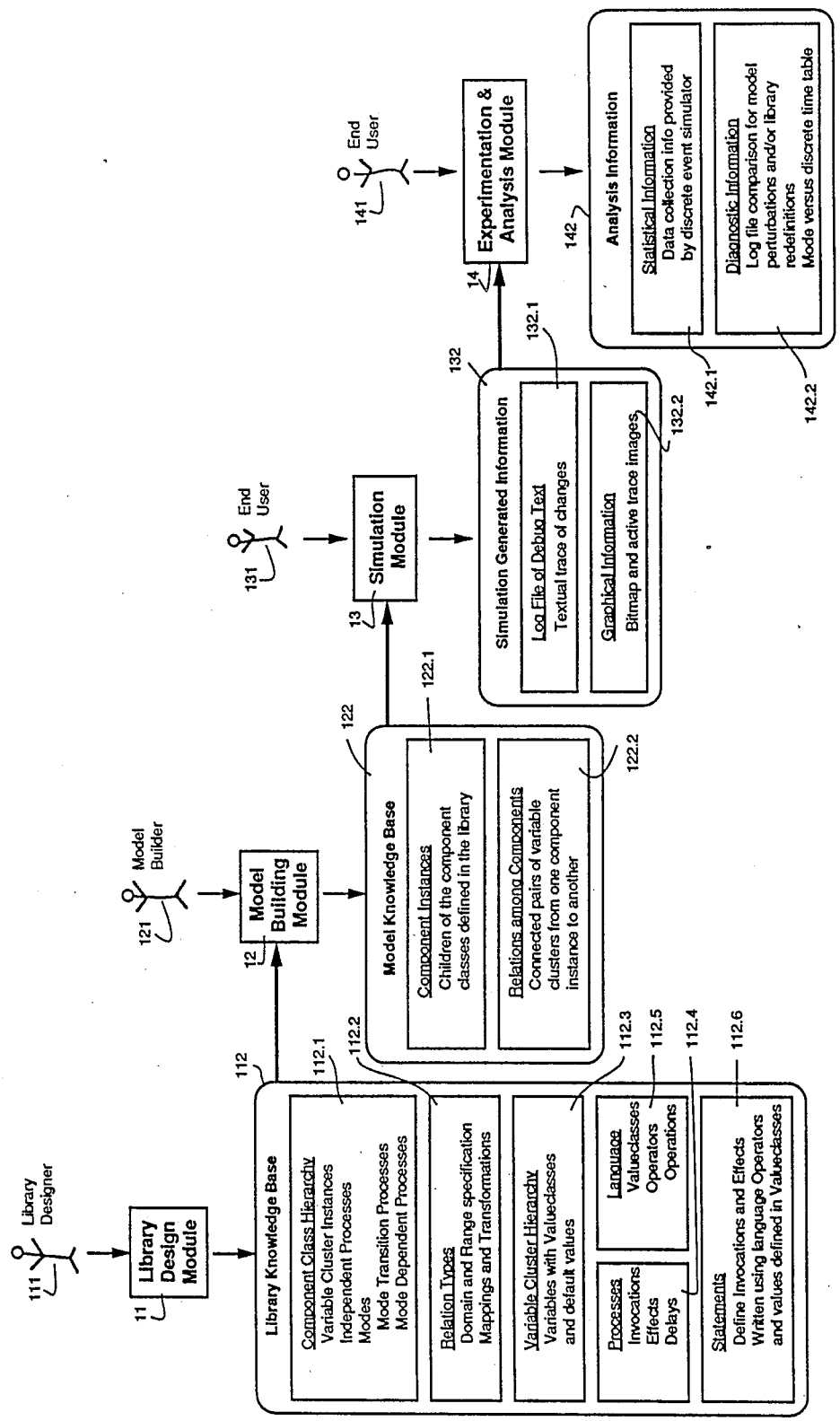
FIG. 1 is an overall block diagram of a qualitative modeling tool in accordance with a preferred embodiment of the present invention, referred to herein sometimes as CONFIG, loaded into a general purpose digital computer for creating, simulating, experimenting with and analyzing qualitative models.
Figure 2:
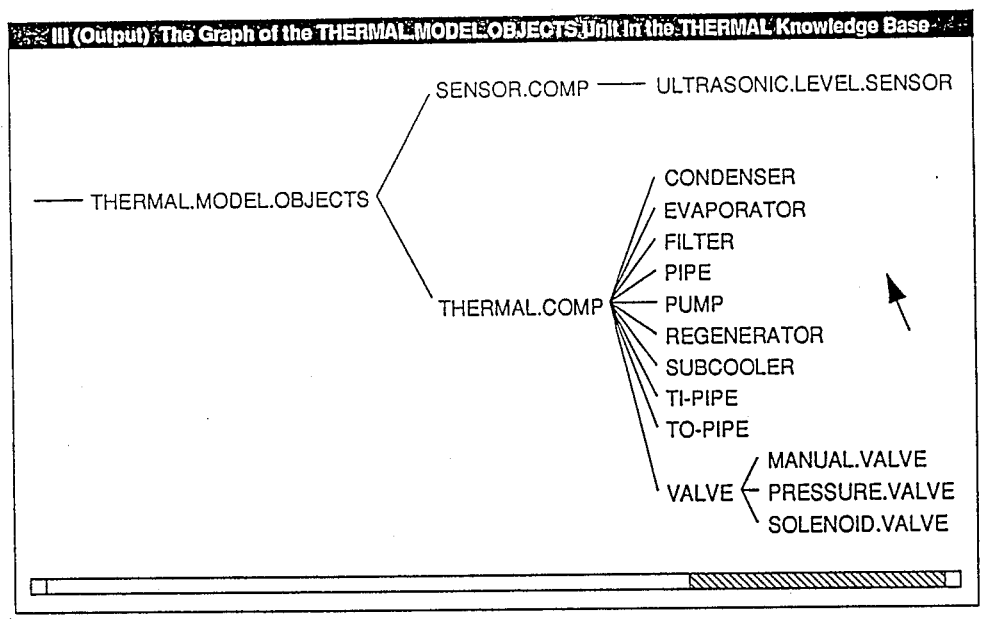
FIG. 2 is an example of a component hierarchy graph.

FIG. 1, a diagram illustrating the use of the qualitative modeling tool loaded into a general purpose digital computer for creating, simulating, experimenting with and analyzing qualitative models. This qualitative modeling tool (or as stated above is often referred to as the "tool") built upon an object-oriented language (KEE TM by IntelliCorp) and a discrete event simulator (SimKit TM by IntelliCorp) with additional functionality provided by the underlying LISP programming environment (Symbolics) is the preferred embodiment of the invention. Even though this is the preferred embodiment, there is nothing about the invention that precludes it from being implemented in various manifestations other than the one described here.

The purpose for computer aided simulation is to support analysis of system behavior beyond what is capable by human beings. Historically, humans have created models represented by computer languages to provide a basis for such simulation. Models provide a formal means for describing systems, but often lack all the information needed to perform adequate simulation of the physical system. In the past, model building has been an extremely laborious and time consuming effort often plagued with unnecessary tedium when defining similar elements. Recently, with the advent of object-oriented programming languages/environments, the concept of hierarchically defined elements have emerged in the form of tools that support the hierarchical design of libraries of class definitions of elements. The information about "parent" elements defined in the library can be inherited to descendant elements of the models; thus, when a change of design is required, a modification may only need to be made to an element in a library and the user can be assured that all instances of the class definitions will change accordingly. These concepts are not novel; however, the approach taken by the invention for knowledge representation in the library is very crucial to the overall design and simulation of the models and is considered an integral part of the innovation.

In order to support such flexible design and simulation of complex models, the tool is comprised of four primary modules (where the word "module" simply means "a conceptually separate functional software subsystem"), as shown in FIG. 1.

The Library design module (as seen in Module 11 of FIG. 1) supports building library knowledge bases generally designated 112 of component classes 112.1 in which all functionality of the components is defined in terms of variable cluster instances, independent processes, and modes which are defined in terms of their mode transition processes and mode dependent processes. Much of this module is provided by the object oriented language in the particular embodiment; however, there have been significant enhancements made by the invention. A unique knowledge representation schema is used for which an extensible formal design language 112.5 is provided to allow the library designer 111 to create statements 112.6 that can be used to define the invocations and effects of processes 112.4. Relation types 112.2 may be defined according to their allowable domain and range components and/or variable clusters. The library designer may also specify variable mappings and transformations for each relation type. These enhancements along with the overall method used to define a library are considered the first portion of the invention and in themselves could support many different approaches to qualitative modelling. This portion of the invention is described in detail in the descriptions of FIG. 2 through FIG. 12.

The Model building module (as seen in Module 12, FIG. 1) supports the construction of model knowledge bases generally designated 122 by making component instances 122.1 of component classes chosen from a particular library constructed via the library design module 11. These component instances 122.1 must then be connected with the appropriate relations 122.2. The model builder 121 need not be concerned with the details of the component level functionality that was defined by the library designer 111. The majority of this module is provided by the discrete event simulator in the particular embodiment; however, the invention insures that the connection of relations is always between a single pair of variable clusters.

The simulation module (as seen in Module 13, FIG. 1) supports the simulation of models built via model building module without dependence on model configuration. Some of this module is provided by the discrete event simulator in the particular embodiment. In particular, the basic model initialization loop and model run loop (described in detail in the descriptions of FIG. 14 and FIG. 15) is provided by the discrete event simulator. The rest of the simulation module's event structure and control flow is considered the second portion of the invention and is described in detail in the descriptions of FIG. 16 through FIG. 24. When the end user 131 performs a simulation via the simulation module 13 several different forms of information may be generated as generally designated in 132. The results of the simulation can either be permanently recorded in a log file of debug text 132.1 or be viewed graphically during simulation by bitmap and active trace images 132.1.

The experimentation and analysis module (as seen in Module 14, FIG. 1) supports the analysis of the output generated by the simulation module. The end user 141 is able to perform various experimentations and analyses based on the analysis information generally designated 142 provided by the tool. Statistical analysis 142.1 is performed by the discrete event simulator in the particular embodiment of the invention. Certain forms of diagnostic analysis 142.2 can be performed by comparing the log file outputs of model perturbations and/or library redefinitions. In addition, tables of modes versus discrete time can be analyzed as a means of predictive analysis. In some cases it is the model configuration that should be experimented with and in others it is the component definitions that warrant investigation. For example, comparing the difference between a specific valve being filed in the open position and a specific valve being failed in the closed position would be considered a model perturbation analysis. Where as, comparing the difference between all pumps failing after X amount of time in a cavitation mode with all pumps failing after Y amount of time in a cavitation mode would be considered a library redefinition analysis.

As described above there are three unique capabilities in the invention a new and more compact schema for delineating the knowledge representation in library design use of the newly created and more robust library structure to implement control methods and event sequencing to simulate model behavior which more faithfully depicts the actual phenomena being studied experimentation on and analysis of models by using the expanded library definitional capabilities and selective simulation techniques to examine the effect of changes of parameter values in simulation results These are not dependent on each other. The simulation techniques could be implemented with other knowledge structures, perhaps not so efficiently. In this embodiment the three major features of the invention have been united to form an efficient and compact combination as described herein.

The following four sections illustrate the manner in which the invention has been implemented in the preferred embodiment.

Library Design Module

Knowledge engineering, like all computer programming disciplines, usually involves learning a complex language in which to express ideas. An important feature of the invention is its success in minimizing the amount of learning that a new library designer must encounter before beginning to design useful libraries. To facilitate this, the invention incorporates a user interface which displays windows, called edit-menus, for the information that the designer is to create. This information includes: components, modes, processes, statements, variable clusters, relations, and the language elements (valueclasses, operators, and operations). The library designer creates the entire library from this edit-menu window system, specialized to the information being manipulated.

The nature of the LISP machine's window system allows the library designer to display many windows on the computer screen at once. This permits the designer to see and add information to the library in many different places at virtually the same time; thus, providing a unique environment for rapid prototyping of libraries.

The invention provides a top level menu that allows the designer to create these edit-menus for the particular elements of the library. This top level menu consists of the following options and their associated sub-options:

Components—this menu option forces the user to select one of the following sub-options:

Create Component—This menu option allows the user to create a new class of components for the library. The new component class is then displayed in an object class edit-menu. This menu option is an enhancement to the standard create object class option provided by the discrete event simulator of the particular embodiment.

Display Edit Menu—This menu option displays the edit-menu for all components. This is one of the key displays because it allows the library designer to get at nearly all of the information within his/her library.

Graph Component Hierarchy—This menu option graphs the component heirarchy of the current library in the output window. This menu option is provided by the object-oriented system used in the particular embodiment.

Relations—this menu option forces the user to select one of the following sub-options:

Create Uni-directional Relation—This menu option allows the library designer to create a unidirectional relation in the library. The new relation is then displayed in the relations class menu. This menu option is an enhancement to the standard create relation option provided by the discrete event simulator of the particular embodiment.

Create Bi-directional Relation—This menu option allows the library designer to create a bi-directional relation in the library. The new relation is then displayed in the relations class menu. This menu option is an enhancement to the standard create relation option provided by the discrete event simulator of the particular embodiment. In fact, the discrete event simulator does not have any notion of bi-directional relationships.

Hide Relation(s)—This menu option allows the library designer (or model builder or simulation user) to hide one or more of the relations in the current model displayed. This is simply a screen management option that allows the users to close some of the line images that represent the component relations. This does not remove the actual relation; it only hides the image.

Show Relation(s)—This menu option performs the opposite function as Hide Relations.

Variable clusters—This menu option displays all variable cluster classes (and instances) in edit-menu. This edit-menu allows the library designer to see what variables and associated valueclasses are defined for which variable cluster (VC).

Processes—This menu option displays all of the processes in the library in an edit-menu. This edit-menu is most useful to see (and create) processes outside of components or modes; such example processes are, trend processes used in a "Try Process" statement.

Language—This menu option displays the language of the current library in an edit-menu. At the top level the edit-menu shows the valueclasses and operators of the library's language, plus any valueclasses and operators inherited from the superlibraries of the current library. The operations of the operators can be found within the display of an individual operator.

Debus log file—This menu option allows the following sub-options for the simulation user to turn on and off a log file which records the changes of the model during a simulation run:

Open—This menu option opens a log file. This will automatically close a log that is already open.

Close—This menu option closes the current log file, if one is open.

From the above menu options, the library designer is able to create the knowledge representation information that is needed for the creation of models and the simulation of such models. Following is a description of the major elements of a library and their appropriate definitions.

Defining Component Classes

Components are the basic building blocks in the invention used to represent the objects of a model. A component does not necessarily have to represent an actual physical entity; it may represent any abstract object that possesses attributes and behavior. Components may inherit attributes and functionality from parent component classes. All components consist of several attributes that are defined by the library designer and are as follows:

Description—This is user supplied text that describes the intended use and functionality of the component. This text is optional and is only intended to aid the designer in capturing his reasoning for making certain design choices.

Constants—This holds the names of the constant attributes defined by the library designer. The names added to this component attribute automatically become additional attributes of the component with associated constant values. Constants are very similar to variables in the variable clusters, except that they may not be changed by any statements (variables are described in more detail in defining variable clusters below and statements are described in more detail in defining statements below).

Variable clusters—This holds the names of the variable cluster instances associated with a component. When a name is added to this component attribute, if the variable cluster (VC) does not exist, then one is created automatically and the designer is prompted to indicate what the parent clusters are for the new instance. In most cases it is simply a decision whether the new cluster is a propagate variable cluster, update variable cluster, both, or neither. (VC's are described in more detail in defining variable clusters below).

Independent processes—This holds the names of the independent processes associated with a component. When a name is added to this component attribute, if the process does not exist, then one is created automatically and the designer is able to fill in its associated attributes (processes are described in more detail in defining processes below).

Mode diagram—This is an attribute that is created by a create mode diagram menu option. It is this diagram that contains the possible modes a component may exhibit and the transitions among the modes. When creating a mode diagram, modes are created with their appropriate attributes; and when a transition is defined among modes, mode transition processes are automatically created. A mode diagram is also used to designate which mode is the initial mode a component is to be initialized with (modes and mode processes are described in more detail in defining modes below).

Some of the above attributes have their own set of attributes; thus, adding to the complete definition of a component. See below for their specific definitions. In addition to the user defined attributes, components have several hidden attributes that are used by the simulation control portion of the invention. They include: (1) component changes, (2) current mode, and (3) initial mode.

A component class is a type of component that is a parent to other component classes (sub-classes) or component instances, thus passing down any attributes and/or functionality defined at its level to all children defined under it. A component class may be considered a generic component, fully functional component, or both. Component classes may only be defined in a library and are created from the tool's top level menu which prompts the user for the parent class of the new component class.

A component instance is a component that has been created from a component class and is not a sub-class (this type of creation is commonly referred to as instantiation). An instance must be a child of a particular component class of a library and in the particular embodiment a component instance must reside in a model. Component instances can be viewed as the lowest leaf in the class inheritance tree. Instances may have many ancestors but may not have any descendants.

Fully functional components are component classes that possess all the functionality required in order to create working component instances in a model.

Generic components are component classes from which the user is able to create subclasses. The concept of generic components is important to the overall design efficiency of the library. Generic components allow the user to make changes to entire classes of components without having to hunt down all the components and make the same change to each. Generic components also provide the designer with levels of classification within individual libraries. They are distinguished from functional components only by their incomplete definition. For example, generic components may only contain characteristics common to a group of components thus, this implies that they may not have all the functionality needed to perform appropriately in a model.

At first it may seem that generic components should never be used in a model (i.e., instantiated). In many cases this is true; however, a component class may be used as both a generic parent class and also a fully functional component class. For example, a valve may be defined as a fully functional component that can be instantiated as a simple valve that may be closed or open; but it can also be considered the generic component class parent for other specific classes of valves such as pressure valves (which automatically open and close based on their input pressure). This is illustrated in the component class hierarchy shown in FIG. 2, where there is VALVE defined at the level just below THERMAL.COMP which has several other classes of valves defined below it. Note that THERMAL.COMP is a generic component class that represents all the attributes common to thermal components and is not considered a fully functional component, in this case, since it does not represent a physical component in the thermal domain. The key point here is that subclasses will inherit all the functionality of their parent plus gain any additional functionality defined at their own level.

The appropriate levels of hierarchical classification is a design issue to be resolved by the library designer. It is also the responsibility of the library designer to keep track of which classes of components are used solely as generic components and which classes are intended to be fully functional. The tool does not differentiate between generic and fully functional components because it would restrict the user to making premature design decisions. The tool assumes all component classes except the root component are fully functional and when instantiated will operate as defined.

Defining Variable Clusters

Variable clusters are groupings of component variables for some purpose. Variables are grouped by adding them to the variables attribute (which is the only attribute) of a variable cluster class or instance. The classic reason for such groupings is the port concept; that is to say that a certain location on the component (called a port) can be specified by a collection of parameters which are stored as the VC's variables. For example, a pipe has two ports one on each end of the pipe, yet it is necessary to refer to the flow and pressure of the fluid as distinct variables at each end. Thus, the library designer would construct two VC's via the variable clusters top level menu option called In and Out, both with the variables flow and pressure. The pipe component would then contain the following four variables: In.Flow, In.Pressure, Out.Flow, and Out.Pressure.

Most importantly, VCs provide the mechanism which allows relations(see defining relations below for more detail on relations) to connect a specific set of variables from a component to a specific set of variables in another component. Another example that illustrates the necessity of variable clusters is given by the following:

Assume a definition of a T-pipe is desired with two inputs and a single output. Assume that this T-pipe has internal variables such as pressure, temperature, flow and fluid phase. It is not possible to simply connect the outputs of two different components to the same set of input variables in the T-pipe. The T-pipe must be modelled such that it receives two separate sets of inputs (In1 and In2) for these variables and combines them in some fashion to determine what the output values of the T-pipe should be. Thus, variable clusters allow the designer to differentiate among multiple inputs for the same set of variables.

VC's may be defined in a hierarchical fashion similar to components. An example of a hierarchy of variable cluster classes can be seen in FIG. 3, which shows some variables defined with associate valueclasses (for more detail on valueclasses see defining language below) for variable clusters defined under downstream VCs.

Figure 4:
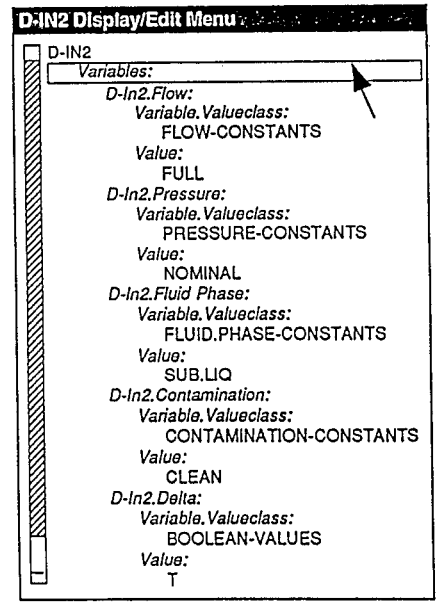
FIG. 4 is an example of a variable cluster instance definition with variables and their default values.

An example of a variable cluster instance can be seen in FIG. 4 which shows the newly created attributes which are the names of the variables concatenated with the name of the cluster. Each new variable attribute has two attributes associated with it: (1) variable.valueclass and (2) value. The variable.valueclass defines what the acceptable values are for that particular variable and the value indicates what the default value is for that variable if it has a default.

The way components get these variable attributes associated with them is by adding a VC instance to a component classes variable clusters attribute. All variable cluster information is then inherited down to the component class. An example of such inheritance may be seen in FIG. 6 which is edit-menu display for the attributes of the pump component class. Upon initialization and before simulation begins, the model component instances inherit the default values of the component classes variables. (see description of simulation module below for more detail on initialization and how default values are used) Note that many different component classes may share the same variable cluster instances and that if a particular component class needs a different default value than what is defined in the variable cluster, then the default value may be defined at the component class level instead. This will effect all children of the component but will not effect any other components that share the same variable cluster.

When a variable cluster is created via the edit-menu for variable clusters obtained from the tool's top level menu or via a component attributes edit-menu, the designer is prompted to indicate what the parent clusters are for the new instance. In most cases it is simply a decision whether the new cluster is a propagate variable cluster, update variable cluster, both or neither. The reason a VC may be both an update and a propagate VC is because the variable cluster class heirarchy may be defined such that the VCs obtain information by multiple inheritance (i.e., a VC may have more than one parent).

An update variable cluster is a VC for which one of its ancestors is the predefined UPDATE.VCS. Thus, in order to create this type of VC, the library designer need only specify UPDATE.VCS as one of the parents when the new VC is created. This type of VC will cause a component update event to be scheduled when any variable in the VC changes, if there is not already an update event scheduled.

A propagate variable cluster is a VC for which one of its ancestors is the predefined PROPAGATE.VCS. Thus, in order to create this type of VC, the library designer need only specify PROPAGATE.VCS as one of the parents when the new VC is created. This type of VC will cause the simulation control mechanism to try to propagate any change that occurs to any variable within the VC to all the related VCs in other components. (this is described in detail in the description of the simulation module below)

Defining Relations

A relation is a mechanism that can be used to relate/connect a variable cluster (VC) in a domain component instance to a variable cluster in other component instances called the range components. Its primary purpose is to provide a path for propagation of information from one component instance to another within a model. When a variable of the domain VC is altered, that change is moved to a corresponding variable in the range VC.

Relations are created from the tools Top Level Menu. Edit-menus for each relation can be created. The attributes associated with a relation are as follows:

Domain—This defines what class of components that this relation can have as its domain. This is, which type of components may this relation be used to connect from.

Domain Variable Cluster—This defines what VC within the domain component is to be related to the range component.

Range—This defines what class of components that this relation can have as its range. That is, which type of components may this relation be used to connect to.

Range Variable Cluster—This defines what VC within the range component is to receive the data from the domain component.

Include—This declares that only certain variables from the VC are to be propagated. This information may be left blank which indicates that all variables are to be propagated except for those declared in the Exclude attribute.

Exclude—This declares which particular variables from the VC that are not to be propagated. This information may be left blank which indicates that all variables are to be propagated if none are declared in the Include attribute.

Mappings—This declares which variables within the domain VC are to be matched to which variables within the range VC. This information may be left blank which indicates that variables of like name are to be matched up.

Transformations—This declares what the values of the variables are to be transformed to. This information may be left blank which indicates that no values are to be transformed during the propagation.

Figure 5:
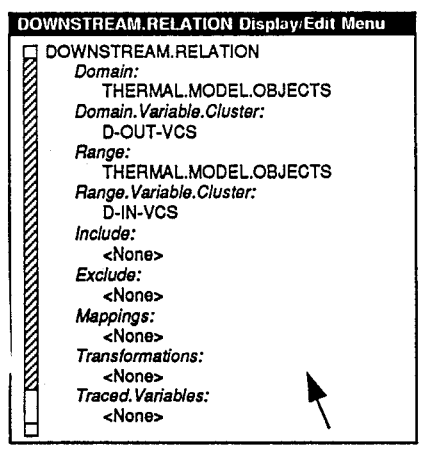
FIG. 5 is an example of a relation definition.
Figure 6:
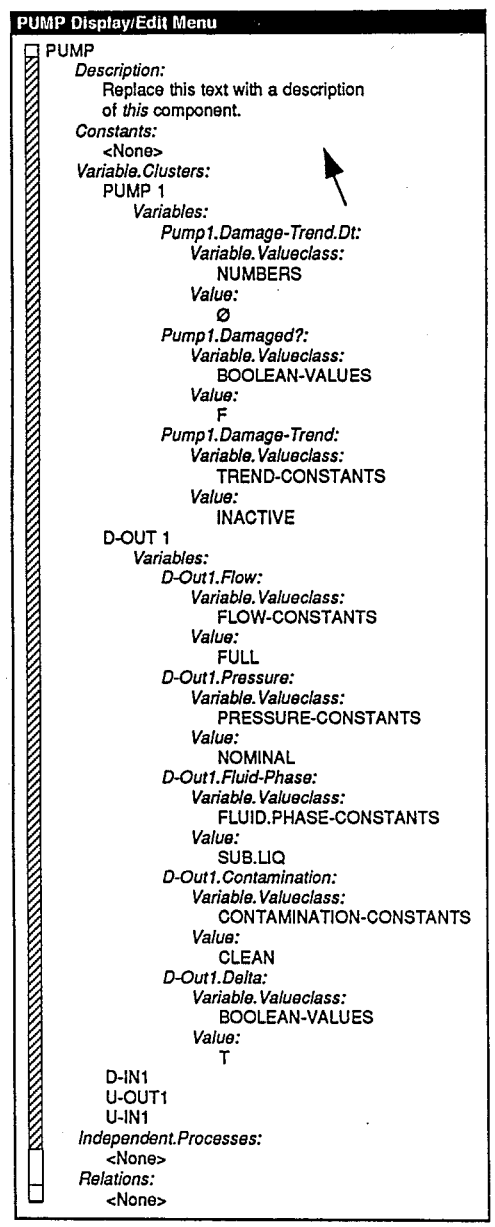
FIG. 6 is an example of a component class definition.

An example of a relation definition is shown in the edit-menu of FIG. 5. This relation may connect any thermal model object to any other thermal model object; however, it may only connect a variable cluster of the domain component that is an instance of the D-OUT-VCS (which is class of VCs that define all the characteristics of downstream output variable clusters) to a variable cluster of the range component that is an instance of the D-IN-VCS (which is class of VCs that define all the characteristics of downstream input variable clusters).

Defining Modes

A mode is a particular operating range that a component may have in which there are unique operating characteristics. These unique operating characteristics are defined by the library designer by filling in the following attributes associated with each mode:

Description—This is text describing the unique characteristics of the mode. This text is optional and is only intended to aid the designer in capturing his reasoning for making certain design choices.

Faulty?—Currently, in the particular implementation of the tool, this attribute is not used by the invention and is intended to be used by a future innovation.

Mode Dependent Processes—This contains the names of the processes that are common to the associated mode. This type of process is evaluated only when a component is in the associated mode. When a name is added to this component attribute, if the process does not exist, then one is created automatically and the designer is able to fill in its associated attributes. (processes are described in more detail in defining processes below).

Mode Transition Processes—This contains the names of the processes that may change the component from the current mode to another mode. When a name is added to this component attribute, if the process does not exist, then one is created automatically and the designer is able to fill in its associated attributes. (processes are described in more detail in defining processes below).

Components may have several operating modes. Modes can be thought of a sectioned-off ranges of interesting behavior within a component. For example, a typical pump will have three modes as seen in FIG. 7: nominal 71 where the pump is operating as expected; cavitate 72, where the pump is cavitating due to input fluid consisting of both vapor and liquid; and shutdown 73, where the pumping mechanism is no longer operable (i.e., failed and has interrupted the flow of the fluid).

Figure 7:
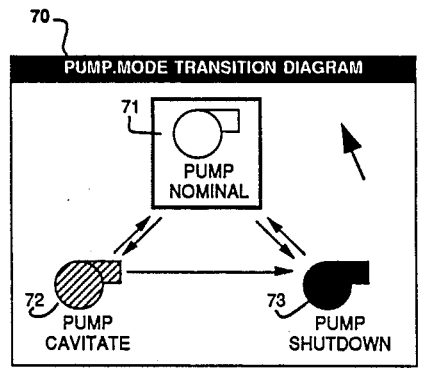
FIG. 7 is an example of a mode diagram.

A component groups it's modes together by a mode transition diagram designated 70 as seen in FIG. 7. The tool's user interface allows the library designer to create modes as bitmap images in the special mode transition diagram window. It also allows the library designer to connect the modes with a next mode line image (represented as an arrow from one mode to the next). As a result of connecting the modes together, mode transition processes are automatically created and added to the mode transition processes attribute of the appropriate mode. These automatically created mode transition processes are merely templates that the library designer must still fill out in order to cause the mode change only when appropriate.

An edit-menu may be created for each mode which displays the mode attributes. Examples of the pump's mode attributes for each mode can be seen in the edit-menus in FIG. 8, FIG. 9, and FIG. 10. Look at FIG. 8, the nominal mode attributes, and notice that it has two mode transition processes associated with it. This corresponds to the fact that the mode diagram FIG. 7 shows two arrows emanating from it to the other two modes. Thus, the pump may go from nominal to cavitate before failing or may go directly to shutdown without cavitating first. Note that the PUMP.NOMINAL.TO.PUMP.CAVITATE process has an invocation that checks to see if the fluid phase in the input variable cluster is not equal to subcooled liquid. This invocation must be true before the pump may change from the nominal to the cavitate mode. This invocation was defined by the library designer and is apparently the only invocation needed. Note that the process has two effects: one changes the current mode to the cavitate mode and the other sets a Pump1.Damage-Trend variable to "up" to indicate that the pump is being damaged while in the cavitate mode. The PUMP.CAVITATE.EFFECT that changes the mode was automatically created by the tool when the Next Mode line image was associated between the two modes. The other effect was added by the user and is used to start the damage trend. An example of a mode dependent process is one which declares that all flow stops in a pump that is in the shutdown mode as seen in FIG. 10. (processes' invocations and effects are described in more detail in defining processes below)

Defining Processes

Processes provide and define the functionality/behavior of all components. There are three types of processes that the library designer may define via the component attributes edit-menu and the mode attributes edit-menu: (1) independent processes, (2) mode dependent processes, and (3) mode transition processes. In addition, there is another type of process called a Try-Process that may be defined via the edit-menu obtained from the processes option of the tool's top level menu. All of these processes are defined in the same manner; however, they are differentiated by where they reside and by what function they usually perform. All processes have the following three attributes associated with them:

Invocations—This contains statements that evaluate to boolean true and false values. During evaluation of the process, these invocation statements must all evaluate to true before the following effects may be executed. If any one of them is not true, then the effects are ignored. If there are no invocations in this attribute, then the effects are executed unconditionally. (statements are described in detail in defining statements below)

Effects—This contains the effects statements that dictate what is to occur in the context of the component. There are three primary types of effects: (1) a try process effect, (2) a change mode effect, and (3) a set variable effect. (These are all described further in the description of the simulation module).

Delays—This contains numbers or qualitative values that corresponding to each effect. Effects are scheduled according to these delays. (this will be described further in the description of the simulation module).

Independent processes reside in the actual component class definition and are always evaluated by the simulation control mechanism no matter what mode the component happens to currently be in. This type of process appears to be fairly rare in the sense that there are few physical components that exhibit a particular behavior at all times; however, it is a convenient way to model a component without having to define specific operating modes. A pipe is a good example of a component that the designer might want to model without any modes and simply define the independent processes accordingly. On the other hand, if the library designer decided that the pipe could possibly rupture or get clogged, then the mode diagram could be added and the independent processes are moved from the component attribute to their appropriate mode attributes.

Mode Transition Processes usually reside in the modes of the component and are processes that try to change the mode of the component to some other mode. The word "try" means that the process is always evaluated when in the particular mode, but that the effect of the process (changing modes) only occurs if some preconditions (the invocations) are satisfied. Technically, the library designer could actually put mode transition processes in the independent processes attribute of a component, but this would result in the process getting tried no matter what mode the component is currently in. In some cases, mode change dispatching from the component might be desirable; but it seems more straight forward to think of a mode changing from one particular mode to another rather than to think of the component changing from any mode to a particular mode. An example of a mode transition process can be seen in FIG. 8, where the current mode is changed to the PUMP.CAVITATE mode via the PUMP-.CAVITATE.EFFECT of the PUMP.NOMINAL.-TO.PUMP.CAVITATE process.

Mode dependent processes always reside in a particular mode and are only evaluated when in that particular mode. A good example is seen in FIG. 10, were the PUMP.SHUTDOWN mode always generates no flow in the FLOW.NONE-PROCESS.

Try-Processes are a special type of process that may be invoked by the effect of another process. Try processes are not necessarily associated with a component attribute or a mode attribute and are usually created via the processes top level menu option. A try process is just like all other processes except that it is invoked individually by an effect event rather than being invoked with many other processes by the component update event (see description of simulation module below for more information on these two types of events). This is analogous to putting conditional events on the event queue, since the effects of this process are only executed if the invocations hold. This is also claimed to be an innovative way to emulate dynamic scheduling of events.

Figure 11:
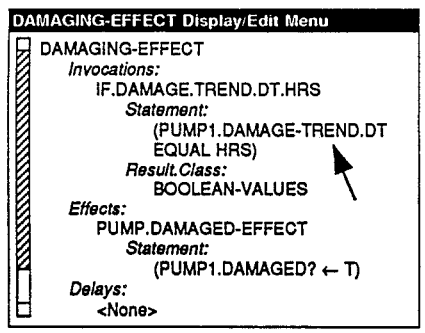
FIG. 11 is an example of a try process.

The PUMP.CAVITATE mode, as seen in FIG. 9, has a mode dependent process call PUMP.BEING.DAMAGED-PROCESS which has a single invocation that checks to see if the pump damage trend is "up". If so, then the process places the TRY.DAMAGING-EFFECT on the event queue at HRS time down the queue. When the discrete event simulator reaches this event, it evaluates the DAMAGING-EFFECT process. As seen in FIG. 11, this process checks to make sure the trend's delta time is equal to HRS before it concludes that the pump is actually damaged. To summarize, these series of processes guarantee that the pump has actually remained in the cavitation mode with damage trend "up" for "HRS" amount of time before it changes the pump to a failed shutdown mode. If something occurs during the interim that changes the Pump1.Damage.Trend variable, then the delta time will automatically get changed internally by the simulation control mechanism. Thus, the DAMAGING-EFFECT process will not be satisfied and the mode will not change until it has remained in a damaged state for the appropriate period of time to cause a shutdown. This will become more clear when reading the simulation module description.

Defining the Language

The language is based on an arithmetic syntax, but is geared to manipulating symbols representing qualitative ranges for variable values. For example, fluid phase could be split up into the ranges: Subcooled.Liquid, Saturated.Liquid, Saturated.Vapor, and Superheated.-Vapor. The library designer is given the facilities to create his/her own qualitative valueclasses, as well as operators which manipulate those values. A language can be created by the language option of the tool's top level menu which will display the edit-menu for a particular library's language. All libraries contain their own language which consists of the following elements:

Operators—This contains the names of all the operators that may be used by the library designer when defining the statements. When a name is added to this attribute, if the operator does not exist, then one is created automatically and the designer need only fill in the necessary operator attributes which include the symbol that is used and the operations associated with the operator. (see below for definition of operator)

Valueclasses—This contains the names of all the valueclasses available to the library designer when defining variables and statements. When a name is added to this attribute, if the valueclass does not exist, then one is created automatically and the designer need only fill in the legitimate values. (see below for definition of valueclass and see defining statements for more detail about statement)

Figure 12:
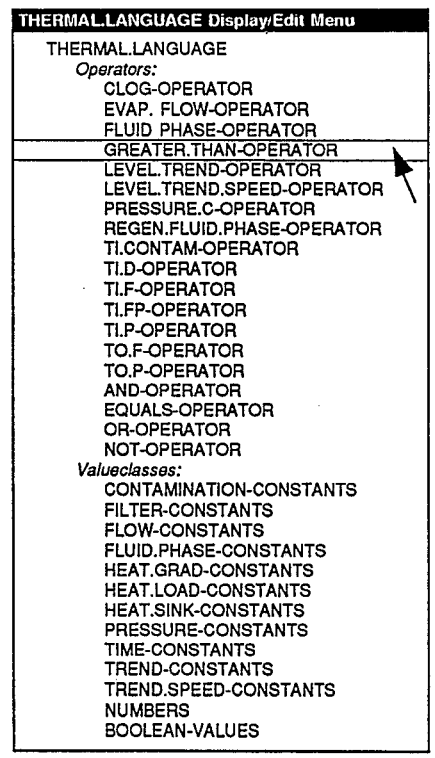
FIG. 12 is an example of a language.

See FIG. 12, the edit-menu of the THERMAL.LANGUAGE, to see an example of a language with its operators and valueclasses. Language elements may be inherited from a superlibrary; thus, allowing the library designer to create additional language elements within the appropriate library and conceivably incrementally increasing the vocabulary of the language.

Operators are used to perform calculations on the values set forth in the valueclasses. The operators Equals, Not, And, and Or and their corresponding operations are predefined by the tool and inherited by all libraries. All operators have the following attributes:

Symbol—This contains a list of the symbols that may be used in the statements to refer to a specific operator. (i.e., the operator in which this attribute resides)

Operations.List—This contains a list of all the operations associated with a particular operator. Multiple operations may be associated with a single operator, since the structure and valueclasses of the operands (or arguments to the operator) may dictate which operation to use.

Operations specify what is to be done when an operator is called with a set of arguments. Most operations have the following attributes:

Argument.Classes.List—This contains an ordered list of valueclasses that represent the possible values of the arguments to the operator.

Result.Class—This contains a single valueclass that dictates what the resultant valueclass of this operation will be.

Figure 13:
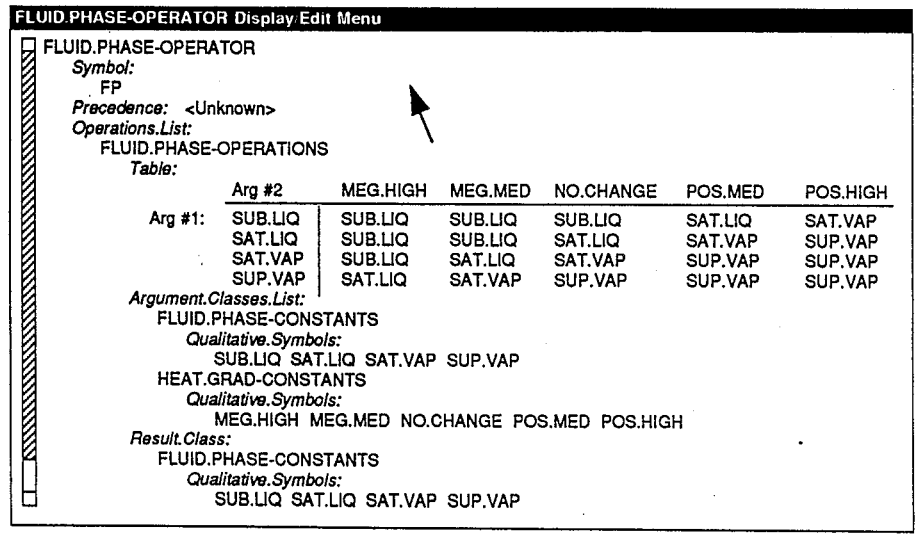
FIG. 13 is an example of an operator and its associated table operation.

The language interpreter matches the arguments of the particular call to the operator with the valueclasses listed in the Argument.Classes.List to determine which is the appropriate operation to use. The most common operation and easiest to define is the table operation as shown in FIG. 13, the FLUID.PHASE-OPERATOR with its FLUID.PHASE-OPERATION.

Valueclasses are a means of categorizing possible values for variables. They are also used to specify the legitimate values of particular arguments to operations and define what the result of the operation should be. Rather than creating valueclasses by adding them to the valueclass attribute of the language, they may also be created by associating them with a variable when defining the variables of a variable cluster. Most valueclasses have an attribute called Qualitative.Symbols that contains a list of the possible values defined by the valueclass. Thus, if a variable is defined with a particular valueclass associated with it, then it may only contain one of the values set forth in the list of Qualitative.Symbols. Some valueclasses are not as restrictive, such as "numbers", which is predefined by the tool and allows the variable to contain any quantitative value (integer or real numbers). The tool also provides another predefined valueclass call "boolean.values" which is needed by the control mechanism to evaluate the result to the invocation statements. See FIG. 3, the THERMAL.-VARIABLE-CLUSTERS edit-menu for an example of variables with their associated valueclasses.

Defining Statements

Statements are associated with processes by adding them to the invocations and effects attributes of the process. They are written in terms of the operators, component variables inherited from the VCs, and the values of the valueclasses defined in the language. They may be defined by filling in the statement attribute with the appropriate expression. See any of the figures with expanded processes in them to see the actual statement attribute associated with each statement.

Effects statements may perform three different types of actions: (1) set a component variable, (2) set a component's mode, or (3) try a process (this is most useful in coordinating trend processes of components as described above in defining processes).

Invocation statements are tests which are performed on the component's variables to determine whether or not the effects of a process would in fact be evaluated. This dictates that the result of such a statement must be a boolean value of some sort.

Statements are the fundamental elements of a library that actually get evaluated during the simulation of the model. Statements, once written, are compiled into LISP code. It is this LISP code that is executed when a component attempts to evaluate a process. Remember, evaluating a process involves the evaluation of the invocations statement's LISP code and then, if all of the results are true, executing the effects statement's LISP code (or scheduling the effects statements to be executed at a later time).

Model Building Module

This module allows the model builder to construct a model graphically, by creating "instances" of components from the Object Class Menu placing the instances in the Model Design Canvas, then connecting the instances with relations obtained from the Relations Class Menu. The manner in which the relations are connected to single pairs of variable clusters rather than simply from one component to another is a unique feature of the invention. This feature is required by the simulation module in order to perform proper propagation of variables.

Simulation Module

Figure 14:
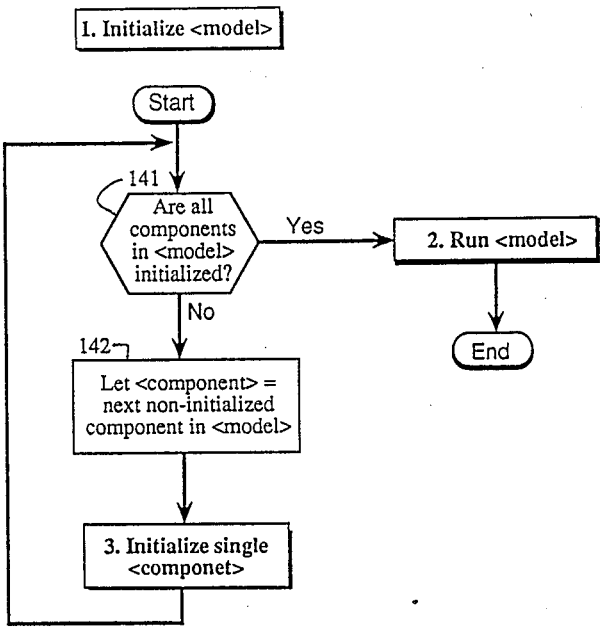
FIG. 14 is a flow chart for the method in which the invention initializes a model of predefined components by executing a specialized initialization routine for each component in the model.

FIG. 14 is a flow chart for the method Initialize model] in which the invention initializes a model of predefined components by executing a specialized initialization routine for each component in the model. FIG. 14, shows a standard way to initialize a model; however, a specialized initialization routine is called for each individual component. As seen in 141, as long as all components have not been initialized individually, then continue to get the next non-initialized component and assigned it as the [component] parameter as in 142, and perform 3.Initialize Single [component] routine. When all components have been initialized, then run the model by performing 2. Run model routine.

Figure 15:
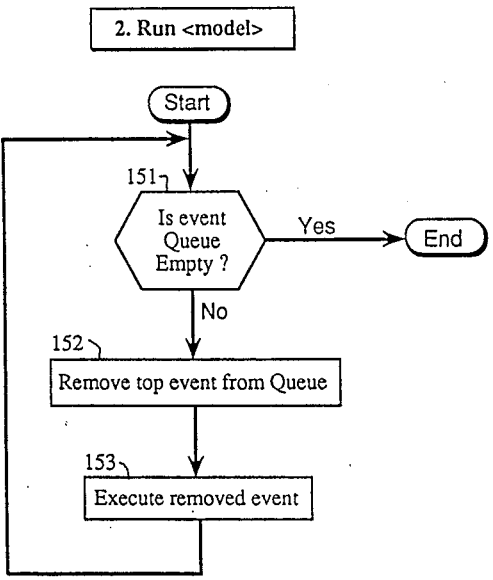
FIG. 15 is a flow chart for the method in which the discrete event simulator (SimKit TM is used) runs the model by executing events on the event queue until the queue is empty.

Turning to FIG. 15, there is shown a flow chart for the method Run [model] in which the discrete event simulator runs the model by executing events on the event queue until the queue is empty. FIG. 15 shows a standard way discrete event simulators execute events. As seen in 151, as long as there are still events left on the queue, then continue to remove the top event from the queue as in 152, and execute the removed event as seen in 153. When the queue becomes empty then the simulator must halt. This FIG. 15 flow chart illustrates the general platform needed to support the control structure of the invention.

By looking at only FIG. 14 and FIG. 15 it can be concluded that there must be some element that places events on the event queue or otherwise the routines would halt immediately. It should be clear that the 3. Initialize Single component routine must be the mechanism by which the invention begins to place events on the queue. It should also be noted that in order for the simulation to continue to run after the initial events are placed on the queue, the execution of the initial events must be doing something to cause subsequent events to be placed on the queue. It is not this aspect that makes the invention novel, but it is the method in which these subsequent events are generated and manipulated which is innovative.

Figure 16:
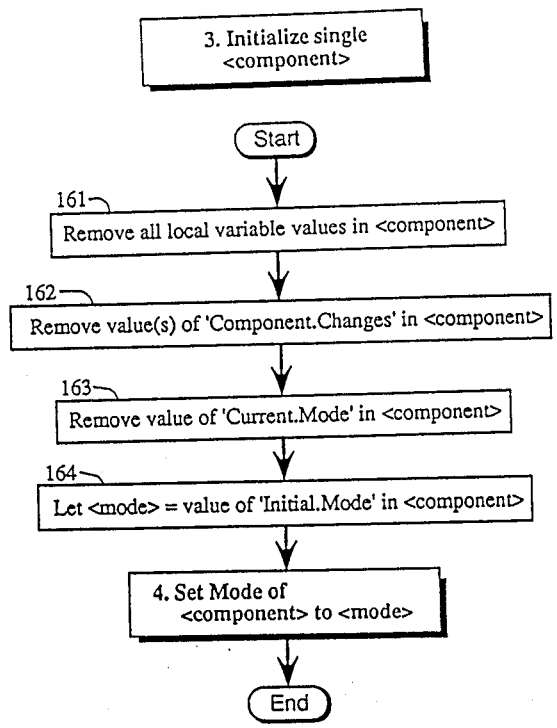
FIG. 16 is a flow chart for the method in which the invention initializes a single component.

FIG. 16 is a flow chart for the method Initialize Single component. As seen in 161, the first thing that is done is that all values of the local variables in component are removed. It is important to know what it means to remove all the local values of a component because this does not imply that all variables within the component become unknown. The component being initialized is a particular component instance in a model that has inherited all its attributes from its parent component class (which may or may not include values of the variables). Local values are values that have been assigned to a given component class or instance and have not been inherited from some parent class. The particular inheritance method used is called "override values" which means local values have precedence over any inherited values. However, if a local value is removed then the new value becomes whatever the parent's value is, rather than becoming unknown (unless the parent's value is also unknown). When defining the component classes in the library, the designer decides which variable values are to have default values and which ones don't. So, by removing all the local values a component instance, it gets all its variables set to their default values. The next thing done is to remove the values of the hidden attribute called "Component Changes" as seen in 162. Also, remove the value of another hidden attribute called "Current Mode" as seen in 163. 162 and 163 are crucial steps which guarantee that the next steps will actually cause an event to get placed on the event queue. 164 assigns the [mode] parameter for the next routine to be the value of another hidden attributes called "Initial Mode". The "Initial Mode" is designated by the library designer when he/she creates a mode diagram for the component class. Now that all the necessary conditions have been set, the 4. Set Mode of [component] to [mode] routine can be executed with the assurance that an actual change will occur when the mode gets set to the value of the Initial Mode. This change will then cause an update event to be scheduled.

Figure 17:
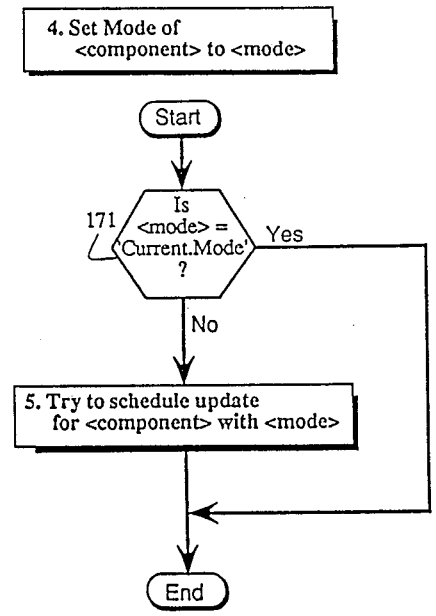
FIG. 17 is a flow chart for the method which describes what the invention does when it sets the mode of a particular component to a particular mode.

Turning to FIG. 17, there is shown a flow chart for the method Set Mode of [component] to [mode] which describes what the invention does when it sets the mode of a particular component to a particular mode. If the new mode of component is different from the Current Mode of component as seen in 171, then 5. Try to Schedule Update for component with mode, else do nothing if the mode is the same. Note that during initialization (i.e., if this routine is called from 3. Initialize Single component) then the mode will always be different, thus guaranteeing the execution of 5. Try to Schedule Update for component with mode routine. Note also that this routine can be called from routine 9. Effect Event for effect or component.

Figure 3:
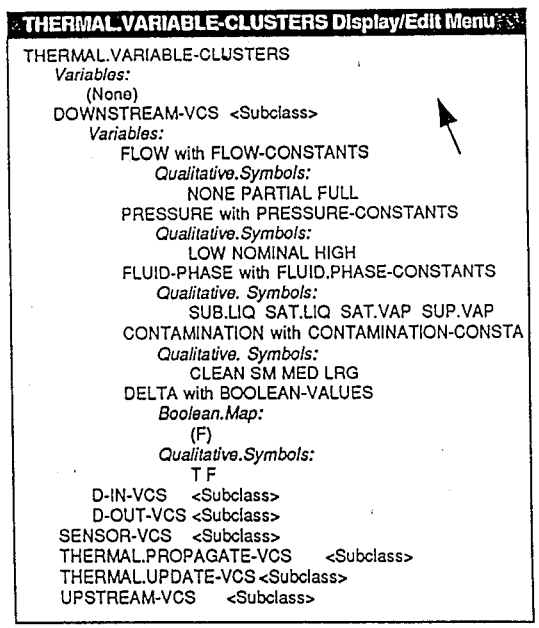
FIG. 3 is an example of a variable cluster heirarchy with some variables defined with their associated valuclasses.
Figure 18:
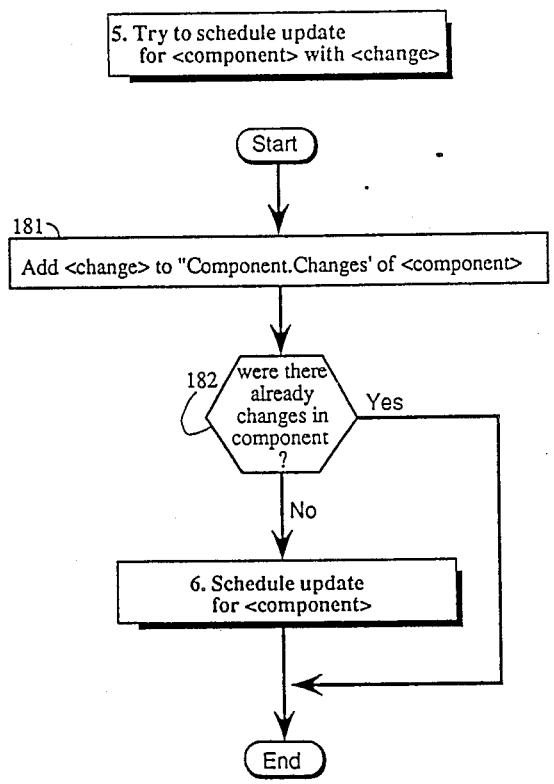
FIG. 18 is a flow chart for the method which describes what the invention does when it tries to schedule an update event for a particular component due to a particular change in the component.
Figure 19:
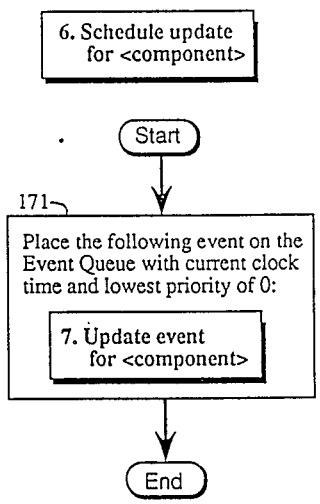
FIG. 19 is a flow chart for the method which describes how the invention schedules an update event for a particular component.
Figure 20:
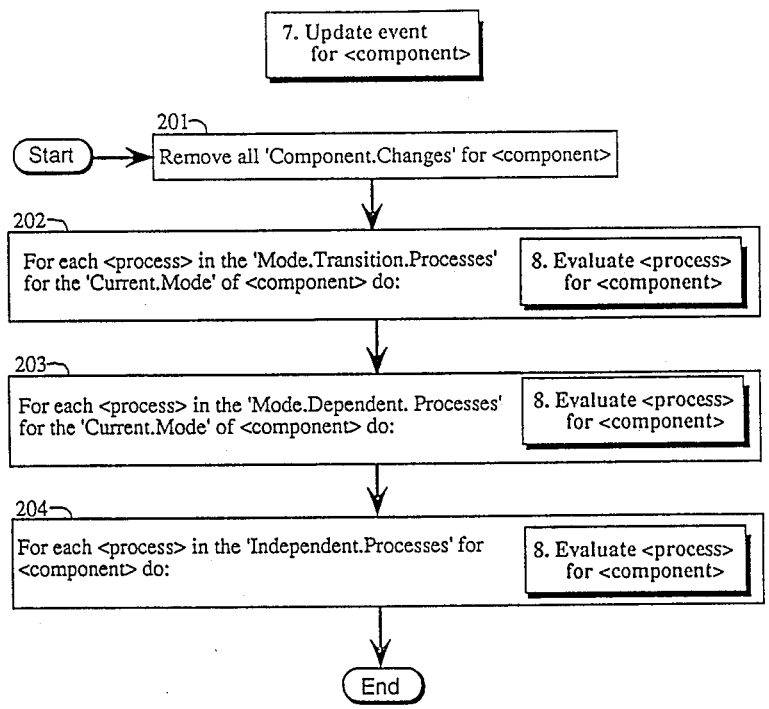
FIG. 20 is a flow chart for the method which describes what the invention's update event does when it gets executed by the discrete event simulator.

FIG. 18 is a flow chart for the method Try to Schedule Update for [component] with [change] which describes what the invention does when it tries to schedule an update event for a particular component due to a particular change in the component. As seen in 181, the change is added to the Component Changes hidden attribute of the component and then in 182 it is determined if there were already changes in this Component Changes attribute. Since the only routines that remove the values of the Component Changes attribute are 3. Initialize Single component as seen in FIGS. 3 and 7. Update Event for component as seen in FIG. 20, and since this is the only routine that can call 6. Schedule Update for component, then there is no need to schedule an update event unless this is the first change. If this change is not the first change in the Component Changes attribute, then there must already be an update event on the event queue for this component; therefore, there is not need to schedule another one because it would be redundant to execute the same update event more than once for a set of changes that occurred during the same time frame. On the other hand, if this is the fist change (i.e. there were no Component Changes for component), then 6. Schedule Update for component.

FIG. 17 is a flow chart for the method Schedule Update for [component] which describes how the invention schedules an update event for a particular component. According to 171, this routine simply places 7. Update Event for [component] on the event queue using the current clock time and the lowest priority of 0. The fact that the event is scheduled with the lowest priority is very important aspect to the invention. It guarantees that any other events scheduled by other update events being executed in the same time frame will possibly have higher priority than the event that has just been scheduled. Her is an example: Suppose a change occurs due to the execution of the top event on the queue and this change is the first change in a component; therefore, an update event for that component will be scheduled by 5. Try to Schedule Update for component with change. But also suppose there were already events on the queue at the same time frame that had higher priority than 0. This means the update event will be placed behind those events. Assume those higher priority events also cause a change to occur in the same component when they get executed. Since they will still be executed before the 7. Update Event for component gets executed they may have side effects that continue to make changes to the component in question. These changes will not cause another update event to be scheduled because the Component Changes already has a value (i.e. each subsequent change is not considered the first change and is therefore ignored). When should another update event get scheduled? Only after the latest one has been executed. Thus, this leads to the next routine shown in FIG. 20 which answers this question.

FIG. 20 is a flow chart for the method Update Event for [component] which describes what the inventions update event does when it gets executed by the discrete event simulator. The answer to the how to signal when a new update should be schedule lies in 201, which removes all the Component Changes from the component. Thus, as soon as any other event causes a change to occur in component, a new update will be scheduled. A new update event may even be scheduled before the completion of the current update event. In most cases that is what happens, because it is the update event that causes new changes to occur within a component. The next thing the update event tries to do, as seen in 202, is change modes by calling 8. Evaluate [process] for [component] for each of the mode transition processes associated with the Current Mode of the component. Note that the evaluation of these processes may or may not actually change the current mode of the component. Next, as seen in 203, all the mode dependent processes are evaluated by calling 8. Evaluate [process] for [component] for each of them. Finally, as seen in 204, all the independent processes are evaluated by calling 8. Evaluate [process] for [component] for each of them. In order to understand how the evaluation of these processes cause subsequent changes occur and subsequent events to be scheduled see next method shown in FIG. 21.

Figure 21:
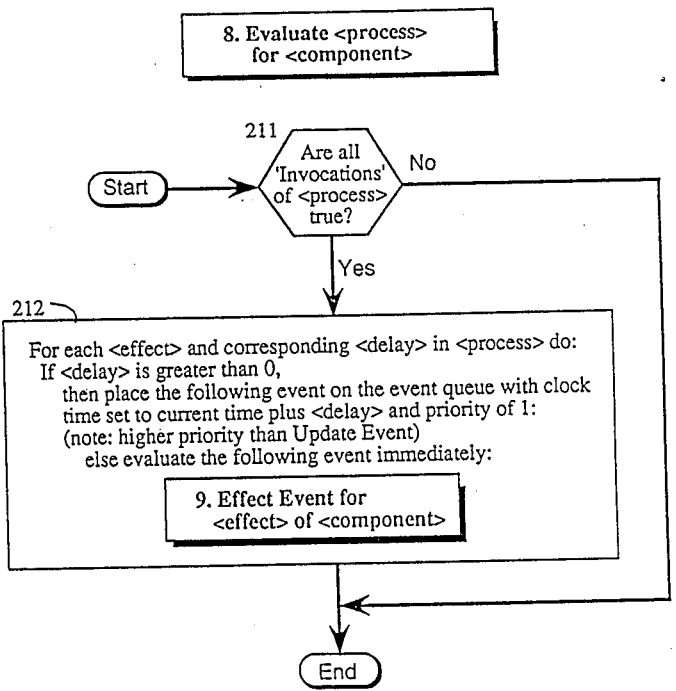
FIG. 21 is a flow chart for the method which describes how the invention evaluates a particular process.

FIG. 21 is a flow chart for the method Evaluate [process] for [component] which describes how the invention evaluates a particular process. As seen in 211, all invocations associated with the process are tested with the component as their evaluation context and if any one is not true, then the rest of the process is ignored. As seen in 212, only when all invocations are satisfied, do any effects get evaluated or scheduled. If so, then each effect that has no delay or a zero delay associated with it will get evaluated immediately. Remember, this is occurring within a process evaluate which was called by the update event. Thus, update events have the ability to initiate changes (execute effects) within a component. The effects that have a delay greater than zero do not get evaluated immediately, instead the 9. Effect Event for [effect] of [component] is put on hold, so to speak, and scheduled delay down the queue (i.e., put on the queue at current clock time plus the delay time). See the next figure (FIG. 22) for the type of effects that get scheduled and their ultimate results.

Figure 22:
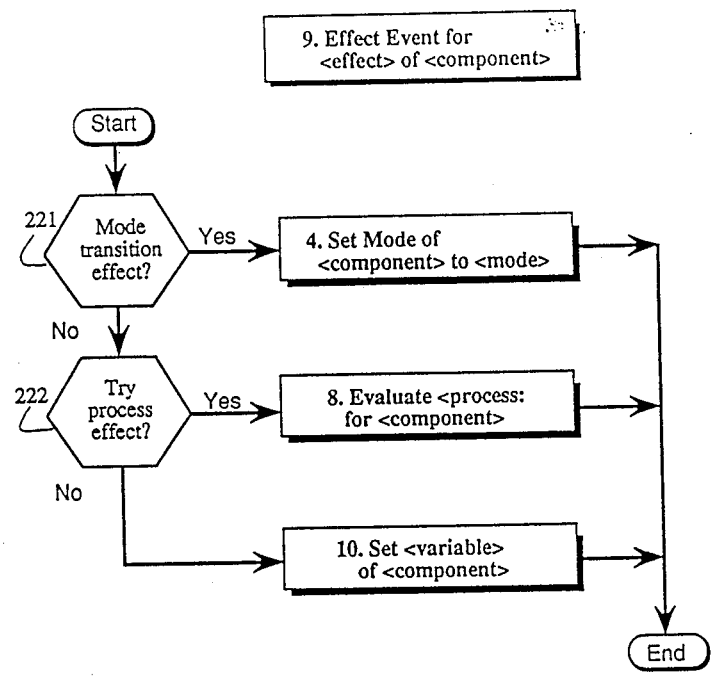
FIG. 22 is a flow chart which describes the possible outcomes when an effect event of the invention gets executed by the discrete event simulator.

FIG. 22 is a flow chart which describes the possible outcomes when an effect event of the invention gets popped off the event queue and executed by the discrete event simulator or gets executed immediately by 8. Evaluate [process] for [component]. As seen in 221, if the effect was a mode transition effect, then the component probably changes to a new mode by calling 4. Set Mode of [component] to [mode]. Else, as seen in 222, if the effect was an effect that tries to evaluate a process, then 8. Evaluate [process] for [component] gets called again. Note that this is a recursive call and in some cases it could even be a self referencing call (i.e., the process that was evaluated may have an effect that actually tries to reevaluate the process. This would continue until the invocations of the process were not satisfied). This portion of the invention is what provides dynamic scheduling of events and thus supports unpredictable events such as trends, which are normally very hard to discretize. As a result, the invention provides an acceptable alternative to modelling historically continuous processes with a discrete event simulator. If both 221 and 222 are not the case, then the effect must simply set a variable of a component which is described in the method.

Figure 23:
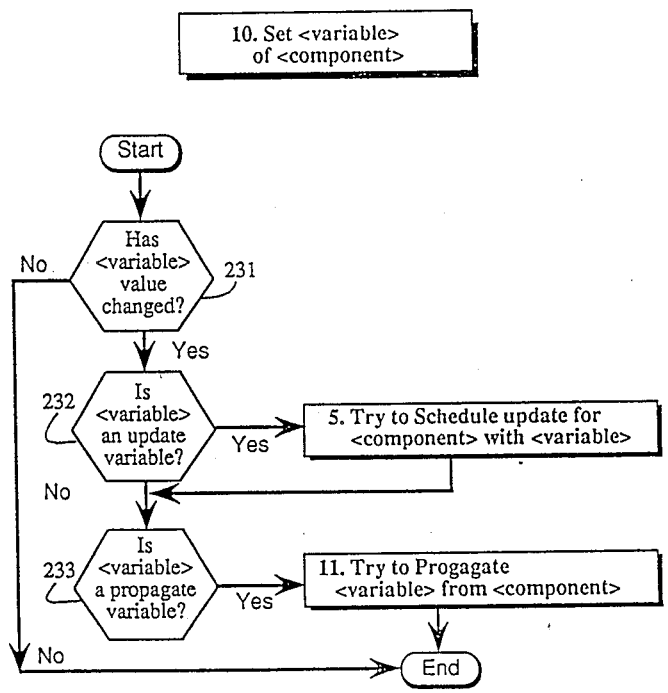
FIG. 23 is a flow chart for the method which describes how the invention sets a particular variable in a component.

FIG. 23 is a flow chart for the method Set [variable] of [component] which describes how the invention sets a particular variable in a component. As seen in 231, this method makes sure the variable has actually changed values, otherwise there is no need to do any thing. According to 232, if the variable is defined in an update variable cluster, then invention tries to schedule and update by calling 5. Try to Schedule Update for [component] with [variable]. Note that this time a variable is passed as the change parameter to this method rather than a mode. After that, as seen in 233, if the variable is defined in a propagate variable cluster, then the invention tries to propagate the variable by calling 11. Try to Propagate [variable] from [component]. Note that both of these method may be called for single variable, since variables may be defined as having the ability to cause propagate, update or both.

Figure 24:
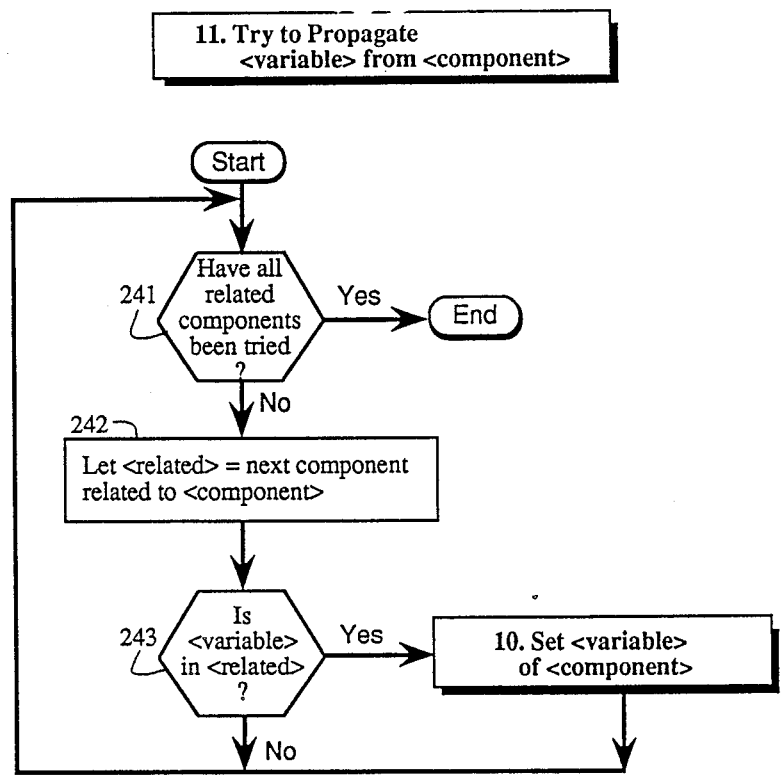
FIG. 24 is a flow chart for the method which describes how the invention tries to propagate a particular variable from a particular component to all its related components.

FIG. 24 is a flow chart for the method Try to Propagate [variable] from [component] which describes how the invention tries to propagate a particular variable from a particular component to all its related components. As seen in 241, if all related components have been tied, then there is no need to send the variable anywhere else. In 242, the next related component is assigned to the related parameter. Then, as seen in 243, if the variable is in the related component, then 10. Set [variable] of [related] where [related] is passed as the component parameter. Note that if 243 is true, then this results in another recursive cll back to the 10. Set [variables] of [component] routine.

Experimentation and Analysis Module

This module allows the end user to experiment with both the library design definitions of the components and the specific component configurations set forth in one or more models.

Analysis information may be produced in various manners, visual analysis can be performed by running a simulation with a portrayal of dynamic activity via bitmap or active trace images. Bitmap images may only represent a variable name and will more along the relation image on the screen whenever a value of that particular variable gets propagate through the relation. Active trace images are also associated with a particular variable name and more with propagation, just as bitmap images do. However, active images show the new value that is being propagated rather than remaining a static bitmap. Active and bitmap trace images are associated with particular relation types and may be turned on or off for any number of relations depending on the analysis desired by the end user. An important feature of these trace images is the ability to associate trace speeds with each image. This is very useful when the user wishes to slow down the simulation. Interesting simulations may be obtained by assigning different trace speeds to a different variable propagated across different relations.

The debug facility allows the user to turn debug on or off for any class of components. Therefore, if the user wishes see a textual description of all the events, he/she can turn debug on for the root class in a library. In most physical systems, the operator of the system is usually only provided with sensor information on which he/she must make all diagnostic decisions. Thus, the tool supports the recording/display of information provided by the sensor class of components. A log file of sensor information plus partial or component information obtained from a simulation may be used to create diagnostic rules or for intelligent decision making or procedures regarding the operation of the system.

In addition to the analysis information provided by the invention, the particular embodiment also provides common statistical information by means of "data collectors". Several types of data collectors are provided which support both graphical and report oriented methods of display.

It is the above forms of analysis information that provides a robust environment for experimentation. The user can easily compare the differences between model perturbations by using one of the above analysis tools. Investigation of component redefinitions require no different approach to analysis. The only difference is the motivation behind each type of analysis. Redefinition analysis is motivated by the users desire to understand and/or modify the design of the system components, were as model perturbation analysis is motivated by the need to gain understanding of the system dynamics. The manner in which the tool accomodates both motivations and allows the user to move freely between them is a significant feature of the invention.

While a preferred embodiment of the invention has been shown and described, and modifications or alternatives have been discussed, it will be understood that the invention is not limited thereto since modifications can be made and will become apparent to those skilled in the art.

What is claimed is:

1. A method for off-line experiments and analyses of an application specific system of components using qualitative modeling and discrete event simulation to analyze dynamic system effects of changes in components with continuous behavior, including malfunction, comprising the steps of:
   providing a library knowledge base of domain specific modeling elements which includes components with modes, mode transition, variables, and behavior descriptions, a qualitative algebra for defining and combining component variables, and relations to link the components, constructed relative to the application specific system,
   providing a model knowledge base for the application specific system, which includes component instances, each with a current mode, linked by relation instances,
   providing change control mechanisms, independent and distinct from the domain specific modeling elements, to select and control effects of changes within the model knowledge base, to control a time-ordered simulation,
   inputting data, which may include malfunction data, to effect changes in the component instances within the model knowledge base, either by changing a variable value of a component instance or by changing the current mode of a component instance,
   updating variable values and the current mode of component instances, and propagating changes through the model knowledge base in a time-ordered fashion in response to the input data and resulting changes, under control of the change control mechanisms,
   and outputting information in response to the changes in variable values and the current mode of component instances and to the propagation of changes through the model knowledge base, to support analysis of effects of changes which may include malfunctions, on modes of component instances, and to support analysis of diagnostic experiments in which effects of malfunctions on the system are compared.

2. The method of claim 1 wherein the step of providing components with modes and mode transitions includes providing normal and malfunction modes, and providing the set of allowable transitions between these modes, to provide the context for mode-specific behavior descriptions.

3. The method of claim 1 wherein the step of providing component behavior descriptions, called processes, includes the steps of:
   providing behavior descriptions for each mode which includes processes that describe each mode-specific behavior and processes that describe each mode transition,
   and providing processes that describe each mode-independent behavior.

4. The method of claim 3 wherein the step of providing processes includes the steps of:
   providing a set of invocation statements that describe conditions that determine whether the process is applicable,
   and providing a set of effect statements, each with an associated delay value, that determine effect actions to be performed on a component instance during a simulation, and the time in the simulation when the actions occur.

5. The method of claim 4 wherein the step of providing the set of effect statements includes providing statements for the steps of:
   setting a component instance variable to a value calculated from combinations of variables from the component instance using the qualitative algebra defined in the library knowledge base,
   setting the current mode of a component instance to one of the modes of the component instance,
   or activating a process of the component instance.

6. The method of claim 1 wherein the step of providing a qualitative algebra for defining and combining component variables includes the steps of:
   providing qualitative valueclasses which are ordered lists of symbols that define the values of specific classes of component variables, to provide discrete values for continuous variables,
   and providing operators on the qualitative valueclasses which describe how to combine the values of qualitative valueclasses that are arguments to the operator, to calculate a resulting qualitative value.

7. The method of claim 6 wherein the step of providing an operator for the qualitative algebra includes the step of providing one or more operations for the operator, to define how to combine each set of applicable qualitative valueclasses that can be used as arguments to the operator.

8. The method of claim 7 wherein the step of providing operations includes the step of describing, in a tabular format, the resulting qualitative value of each combination of the values in the qualitative valueclasses of the arguments to the operation.

9. The method of claim 1 wherein providing relations that link components includes the steps of:
providing variable clusters, which are specific sets of component variables,
and providing a mapping that associates variables of a variable cluster of a domain component with variables of another variable cluster of a range component.

10. The method of claim 1 wherein providing change control mechanisms includes providing a change control mechanism for the variable cluster of the domain component to control the step of propagating changes through the model knowledge base by propagating the values of the variables in the variable cluster of the domain component into the corresponding variables in the linked variable cluster of the range component, based upon the mapping.

11. The method of claim 1 wherein the component instances within the model knowledge base inherit all of their behavior from the description of the component variables, modes, mode transitions, and behavior descriptions; and the variable values of the component instances are local to the component instances; furthermore, all component instances contain a local attribute, called current mode, which keeps track of the mode of the component instance during a simulation.

12. The method of claim 1 wherein the step of providing component variables and modes includes the step of attaching change control mechanisms that respond to changes in variable values and modes by providing the step of storing an update component event on the event queue, with a time value of the simulation time and a priority value of zero.

13. The method of claim 1 wherein providing change control mechanisms includes providing a discrete event simulation control mechanism to control:
providing simulation events, independent and distinct from the domain specific modeling elements, which are actions with simulation time information, created in response to changes in component instances,
storing future events in the simulation on an event queue, which contains an ordered list of the simulation events, each with an associated time of the event,
running the discrete event simulator which includes the steps of executing the next event on the queue, and halting when there are no more events on the queue,
storing the simulation time which is the time value of an event being executed, into a simulation clock variable.

14. The method of claim 13 wherein events on the event queue are ordered by the time value associated with the event, is ascending order, and sub-ordered by an integer priority value, in descending order.

15. The method of claim 13 wherein the step of providing simulation events includes providing descriptions of actions to be performed on component instances within the model knowledge base.

16. The method of claim 15 wherein the actions to be performed on component instances include the steps of:
updating the component instance;
and performing effect actions on the component instance.

17. The method of claim 16 wherein the step of updating the component instance includes the steps of:
activating the mode transition processes of the current mode of the component instance, activating the mode specific processes of the current mode of the component instance,
and activating the mode independent processes of the component instance.

18. The method of claim 17 wherein the step of activating the processes includes the steps of:
evaluating all of the invocation statements of the process,
performing the effect actions of all of the effect statements of the process, on the component instance, based on the delay value of the effect statement, if and only if all of the invocation statements evaluate to true.

19. The method of claim 18 wherein the step of performing the effect action occurs immediately if the delay value of the effect statement is zero; otherwise, an effect execution event, to perform the effect action on the component instance, is added to the event queue with a time value of the simulation time plus the effect statement delay value, and a priority value of one.

20. The method of claim 16 wherein the effect statements include actions for the steps of:
setting a variable of the affected component instance to a value calculated from combinations of variables from the affected component instance using operators from the qualitative algebra defined in the library knowledge base,
setting the current mode of the affected component instance to one of the modes of the component instance, or activating a process of the component instance.

21. The method of claim 1 wherein the outputting of information in response to changes in the model knowledge base includes outputting a graphic representation of the component instances and the relation instances.

22. The method of claim 21 wherein the outputting of the graphic representation includes outputting bitmaps of the component instances which are specific to the current mode of the component instance.

23. The method of claim 1 wherein the output of a simulation includes a textual output of the sequence of changes occurring in component instance, each with an associated simulation time.

24. The method of claim 1 wherein the output of a set of simulations is recorded into some format, either using files of the text output or time-based tables, in order to compare effects of changes, including malfunctions, on the application specific model.

25. A simulation and analysis tool for off-line experiments and analyses of an application specific system of components using qualitative modeling and discrete event simulation to analyze dynamic system effects of changes in components with continuous behavior, including malfunctions, comprising:

- a library knowledge base of domain specific modeling elements which includes components with modes, mode transitions, variables, and behavior descriptions, a qualitative algebra for defining and combining component variables, and relations to link the components, constructed relative to the application specific system,
- a model knowledge base for the application specific system which includes component instances, each with a current mode and linked by relation instances,
- means for inputting data to effect changes of component instances within the model knowledge base, either by changing a variable value of a component instance or by changing the current mode of a component instance,
- change control mechanisms, independent and distinct from the domain specific modeling elements, to select the control effects of changes within the model knowledge base, by updating variable values and the current mode of the component instances, and by propagating changes in the model knowledge base in a time-ordered fashion in response to input data and the resulting changes, under control of the change control mechanisms,
- means for applying the change control mechanisms to select and control changes in the component instance variables and the current mode of the component instances,
- a discrete event simulator including an event queue containing an ordered list of simulation events, a clock containing the simulation time, and the simulation events, independent and distinct from the domain specific modeling elements, that are created under control of the change control mechanisms,
- means for running the discrete event simulator,
- and means for outputting information in response to changes of variable values and the current mode of component instances, and to the propagation of changes through the model knowledge base.

* * * * *